(12) United States Patent
Otsuka et al.

(10) Patent No.: US 8,466,930 B2
(45) Date of Patent: Jun. 18, 2013

(54) COLOR ADJUSTMENT CIRCUIT

(75) Inventors: Koji Otsuka, Osaka (JP); Daisuke Koyama, Osaka (JP); Osamu Mamba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 490 days.

(21) Appl. No.: 12/681,482

(22) PCT Filed: Oct. 2, 2008

(86) PCT No.: PCT/JP2008/067957
§ 371 (c)(1),
(2), (4) Date: Apr. 2, 2010

(87) PCT Pub. No.: WO2009/044827
PCT Pub. Date: Apr. 9, 2009

(65) Prior Publication Data
US 2010/0277500 A1    Nov. 4, 2010

(30) Foreign Application Priority Data

Oct. 5, 2007    (JP) .................................. 2007-262482

(51) Int. Cl.
*H04N 9/64* (2006.01)
*H04N 1/60* (2006.01)
*G09G 5/02* (2006.01)
*G09G 5/00* (2006.01)
*G03F 3/08* (2006.01)
*G06K 9/00* (2006.01)
*G06K 9/40* (2006.01)
*G06K 9/54* (2006.01)

(52) U.S. Cl.
USPC ........... 345/589; 345/581; 345/591; 345/658; 345/443; 345/690; 348/552; 348/630; 358/518; 382/167; 382/254; 382/274; 382/297

(58) Field of Classification Search
CPC ...... H04N 1/6005; H04N 1/6058; H04N 9/643
USPC ................. 345/581, 589–591, 600–604, 649, 345/654, 657–658, 443, 690; 348/552–553, 348/557, 560, 562, 566, 571, 577, 582, 630, 348/635, 671, 674–675, 679; 358/515, 518–520, 523; 382/162, 167, 254, 382/274, 276, 293, 296–297
See application file for complete search history.

(56) References Cited

U.S. PATENT DOCUMENTS 6,008,912 A    12/1999 Sato et al.
(Continued)

FOREIGN PATENT DOCUMENTS

EP    1 480 468 A2    11/2004
(Continued)

OTHER PUBLICATIONS

Office Action dated Oct. 26, 2010 for Japanese Application No. 2009-536088.

(Continued)

*Primary Examiner* — Wesner Sajous
(74) *Attorney, Agent, or Firm* — Birch, Stewart, Kolasch & Birch, LLP

(57) ABSTRACT

The fact that B and R are close to a U axis and to a V axis, respectively, is noted. On that basis, from an example of color adjustment parameters set in directions of colors, it is found out that, when inputted V is in a negative range, B has a small influence. Accordingly, a B component is omitted from calculation in order to reduce a calculation amount. Similarly, components having small influences are omitted when B is in a positive range, when U is in the positive range, and when U is in the negative range. Thereby, adjustment parameters $A_R$, $A_G$, and $A_B$ set in directions shown in the drawing can be defined. When inputted V is in the positive range, a V component can be adjusted by multiplying $A_R$ by the inputted V. Similar processing is performed when inputted V is in the negative range, when U is in the positive range, and when U is the negative range, respectively. With this taken into consideration by setting values of the adjustment parameters for respective RGB larger than 1 or smaller than 1, color transformation processing for adjusting darkness/lightness of colors can be performed, independently of brightness, so as to bring values of U and V close toward a color component to be increase in intensity. This allows reduction in load of color transformation processing.

11 Claims, 23 Drawing Sheets

Configuration example of video signal processor

U.S. PATENT DOCUMENTS

| | | |
|---|---|---|
| 6,188,529 B1 * | 2/2001 | Koyama et al. ............... 359/738 |
| 6,744,920 B1 | 6/2004 | Sakaida |
| 2004/0263456 A1 | 12/2004 | Miyachi et al. |
| 2005/0018054 A1 | 1/2005 | Kato |
| 2005/0052545 A1 | 3/2005 | Ting |
| 2005/0266395 A1 * | 12/2005 | Gholap et al. ..................... 435/4 |
| 2006/0013478 A1 | 1/2006 | Ito et al. |
| 2007/0273686 A1 * | 11/2007 | Watanabe et al. ............. 345/419 |

FOREIGN PATENT DOCUMENTS

| | | |
|---|---|---|
| EP | 1538848 A1 | 6/2005 |
| JP | 61-19292 A | 1/1986 |
| JP | 3-73694 A | 3/1991 |
| JP | 11-017974 A | 1/1999 |
| JP | 2001-128191 A | 5/2001 |
| JP | 2002-58042 A | 2/2002 |
| JP | 2003-224860 A | 8/2003 |
| JP | 2005-25122 A | 1/2005 |
| JP | 2005-57748 A | 3/2005 |
| JP | 2005-85268 A | 3/2005 |
| JP | 2005-134866 A | 5/2005 |
| WO | WO 2004/032524 A1 | 4/2004 |

OTHER PUBLICATIONS

Japanese Office Action for Japanese application 2001-09892, dated Jul. 26, 2011.

European Search Report for Application No. 08835949.2, dated Dec. 18, 2012.

* cited by examiner

Distribution of colors on UV plane

Distribution of colors on UV plane

Adjustment parameters

Definition of adjustment parameters

Transformation according to first embodiment

Transformation according to third embodiment

Input/Output of R data

Input/Output of G data

Input/Output of B data

Input/Output characteristics of data
(When increased in intensity)

Input/Output characteristics of data
(When decreased in intensity)

Input/Output characteristics of data RGB
(When increased in intensity)

Input/Output characteristics of data RGB
(When decreased in intensity)

Input/Output characteristics of data RGB
(When increased in intensity)

Input/Output characteristics of data RGB
(When decreased in intensity)

Input/Output characteristics of data RGB
(When increased in intensity)

Configuration example of display device

Usage scene 2 (Transmission and reception of set values)

Configuration example of video signal processor (A) Color transformation equation according to first embodiment $$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

$$\alpha = \begin{cases} A_B & (U \geq 0) \\ A_G & (U < 0) \end{cases}$$

$$\beta = \begin{cases} A_R & (V \geq 0) \\ A_G & (V < 0) \end{cases}$$

(B) Flowchart for implementing first embodiment with software

FIG. 25

(A) Color transformation equation according to second embodiment $$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 1

$$\alpha = \begin{cases} (S1+V)+(T1-V) \cdot A_B & (U \geq 0) \\ (S2+V)+(T2-V) \cdot A_G & (U < 0) \end{cases}$$

$$\beta = \begin{cases} (S3+U)+(T3-U) \cdot A_R & (V \geq 0) \\ (S4+U)+(T4-U) \cdot A_G & (V < 0) \end{cases}$$

(B) Flowchart for implementing second embodiment with software

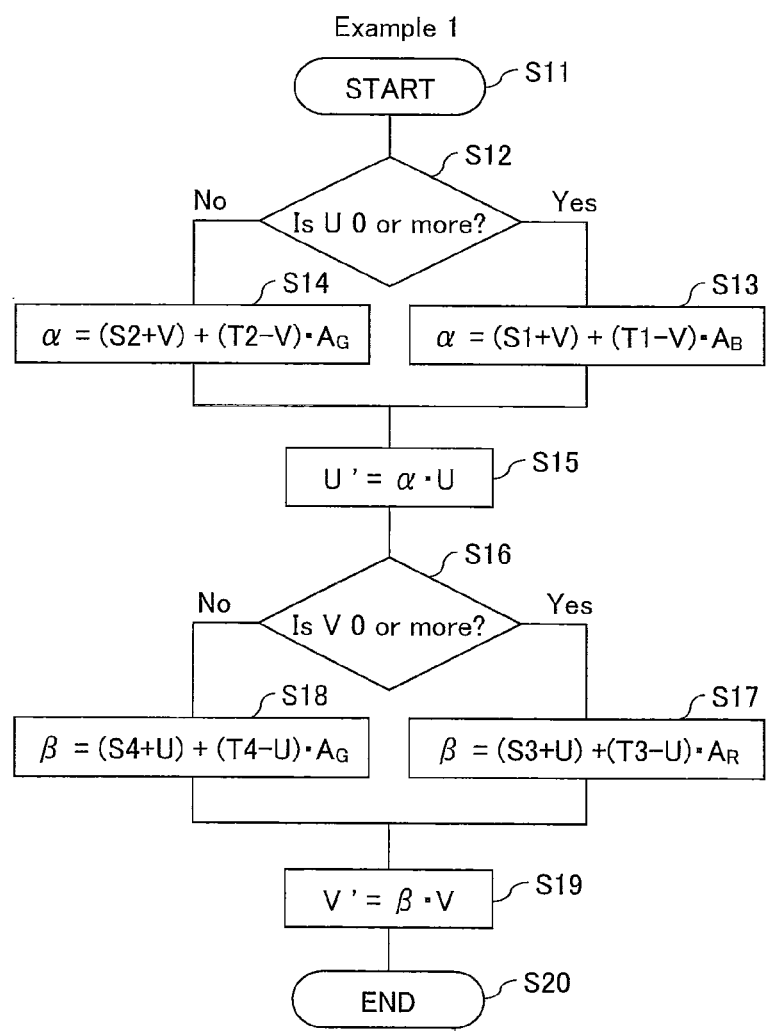

FIG. 26

(A) Color transformation equation according to second embodiment $$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 2

$$\alpha = \begin{cases} P1(V) + Q1(V) \cdot A_B & (U \geq 0) \\ P2(V) + Q2(V) \cdot A_G & (U < 0) \end{cases}$$

$$\beta = \begin{cases} P3(U) + Q3(U) \cdot A_R & (V \geq 0) \\ P4(U) + Q4(U) \cdot A_G & (V < 0) \end{cases}$$

(B) Flowchart for implementing second embodiment with software

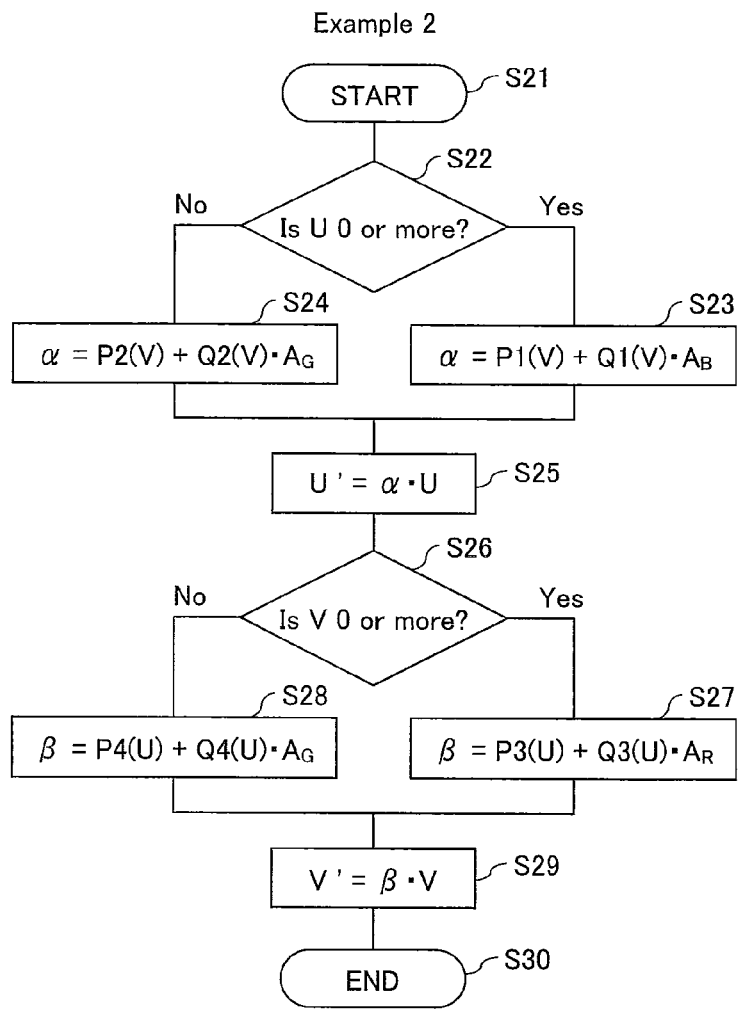

FIG. 27

(A) Color transformation equation according to third embodiment $$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 1

$$\alpha = \begin{cases} (S1+V) \cdot A_M + (T1-V) \cdot A_B & (U \geq 0) \\ (S2+V) \cdot A_{Ye} + (T2-V) \cdot A_G & (U < 0) \end{cases}$$

$$\beta = \begin{cases} (S3+U) \cdot A_M + (T3-U) \cdot A_R & (V \geq 0) \\ (S4+U) \cdot A_C + (T4-U) \cdot A_G & (V < 0) \end{cases}$$

(B) Flowchart for implementing third embodiment with software

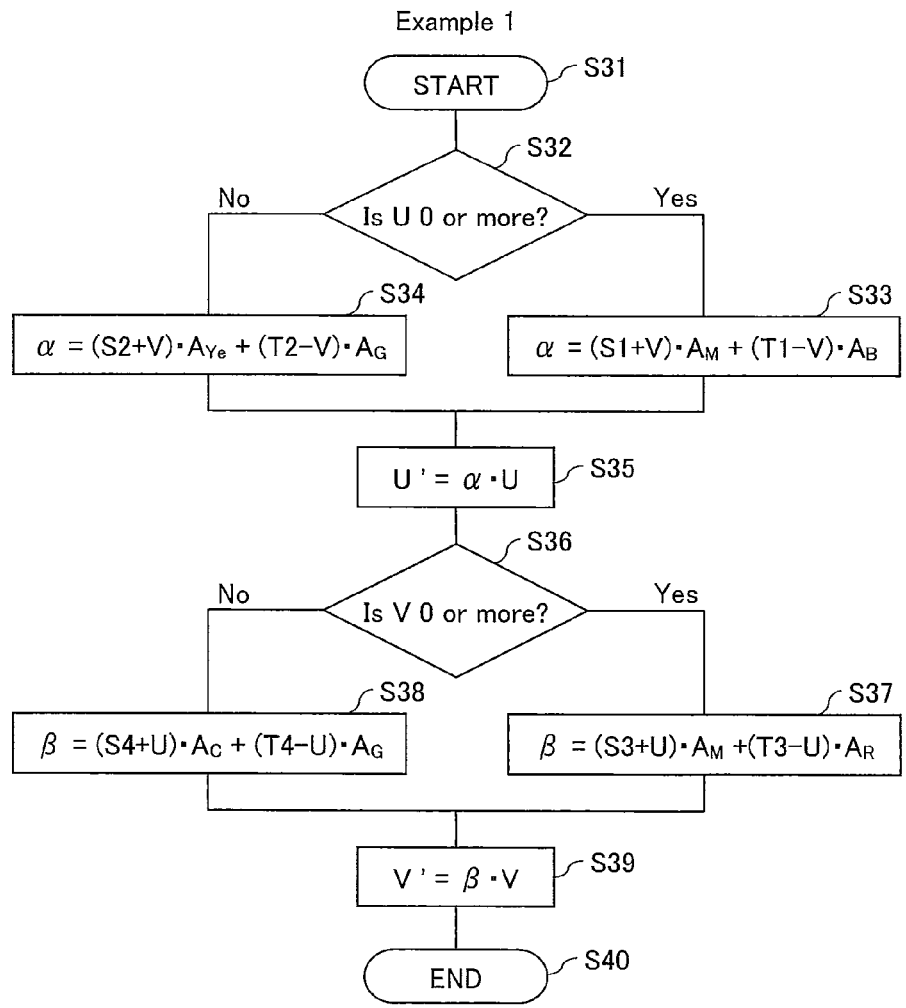

FIG. 28

(A) Color transformation equation according to third embodiment $$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 2

$$\alpha = \begin{cases} P1(V) \cdot A_M + Q1(V) \cdot A_B & (U \geq 0) \\ P2(V) \cdot A_{Ye} + Q2(V) \cdot A_G & (U < 0) \end{cases}$$

$$\beta = \begin{cases} P3(U) \cdot A_M + Q3(U) \cdot A_R & (V \geq 0) \\ P4(U) \cdot A_C + Q4(U) \cdot A_G & (V < 0) \end{cases}$$

(B) Flowchart for implementing third embodiment with software

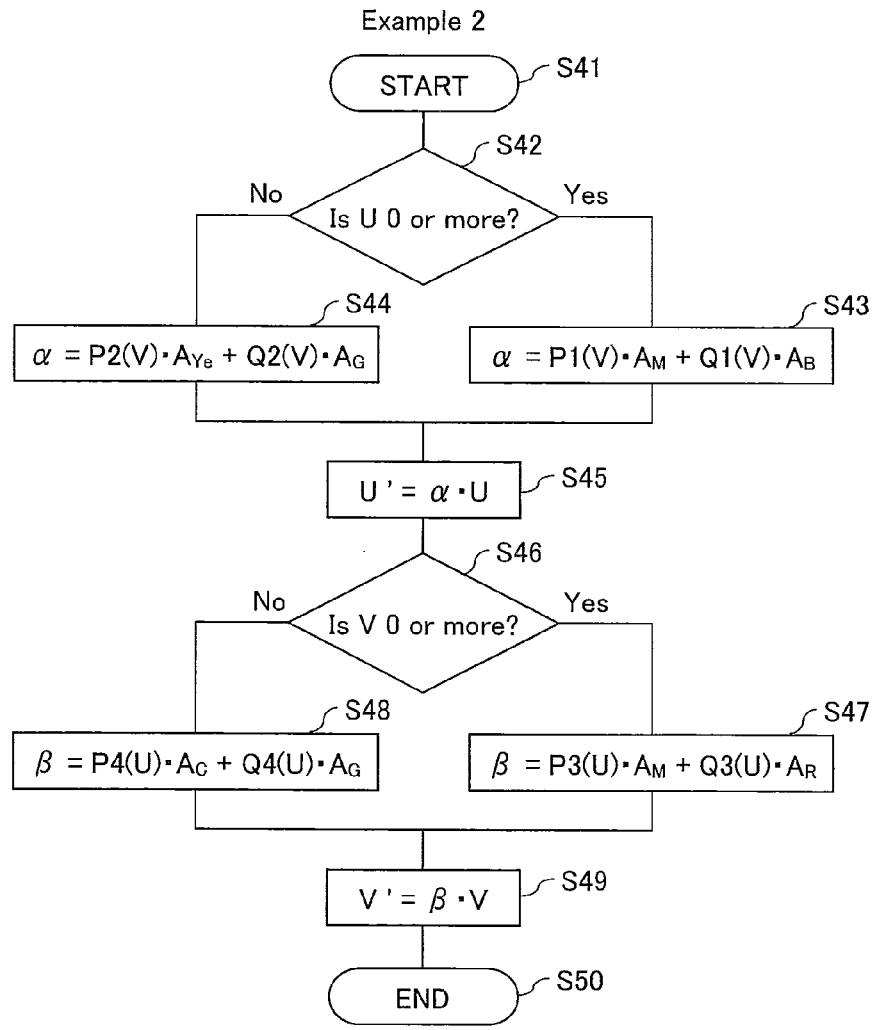

(A)

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

$$\alpha = \begin{cases} A_B & (U \geq 0) \\ A_G & (U < 0) \end{cases}$$

$$\beta = \begin{cases} A_R & (V \geq 0) \\ A_G & (V < 0) \end{cases}$$

(B)

(A)

$$\begin{bmatrix}U'\\V'\end{bmatrix}=\begin{bmatrix}\alpha & 0\\0 & \beta\end{bmatrix}\begin{bmatrix}U\\V\end{bmatrix}$$

$$\alpha = \begin{cases}(\tfrac{1}{2}+V)+(\tfrac{1}{2}-V)\cdot A_B & (U\geq 0)\\(\tfrac{1}{2}+V)+(\tfrac{1}{2}-V)\cdot A_G & (U<0)\end{cases}$$

$$\beta = \begin{cases}(\tfrac{1}{2}+U)+(\tfrac{1}{2}-U)\cdot A_R & (V\geq 0)\\(\tfrac{1}{2}+U)+(\tfrac{1}{2}-U)\cdot A_G & (V<0)\end{cases}$$

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

$$\alpha = \begin{cases} \left(\frac{1}{2}+V\right) \cdot A_M + \left(\frac{1}{2}-V\right) \cdot A_B & (U \geq 0) \\ \left(\frac{1}{2}+V\right) \cdot A_{Ye} + \left(\frac{1}{2}-V\right) \cdot A_G & (U < 0) \end{cases}$$

$$\beta = \begin{cases} \left(\frac{1}{2}+U\right) \cdot A_M + \left(\frac{1}{2}-U\right) \cdot A_R & (V \geq 0) \\ \left(\frac{1}{2}+U\right) \cdot A_C + \left(\frac{1}{2}-U\right) \cdot A_G & (V < 0) \end{cases}$$

(B)

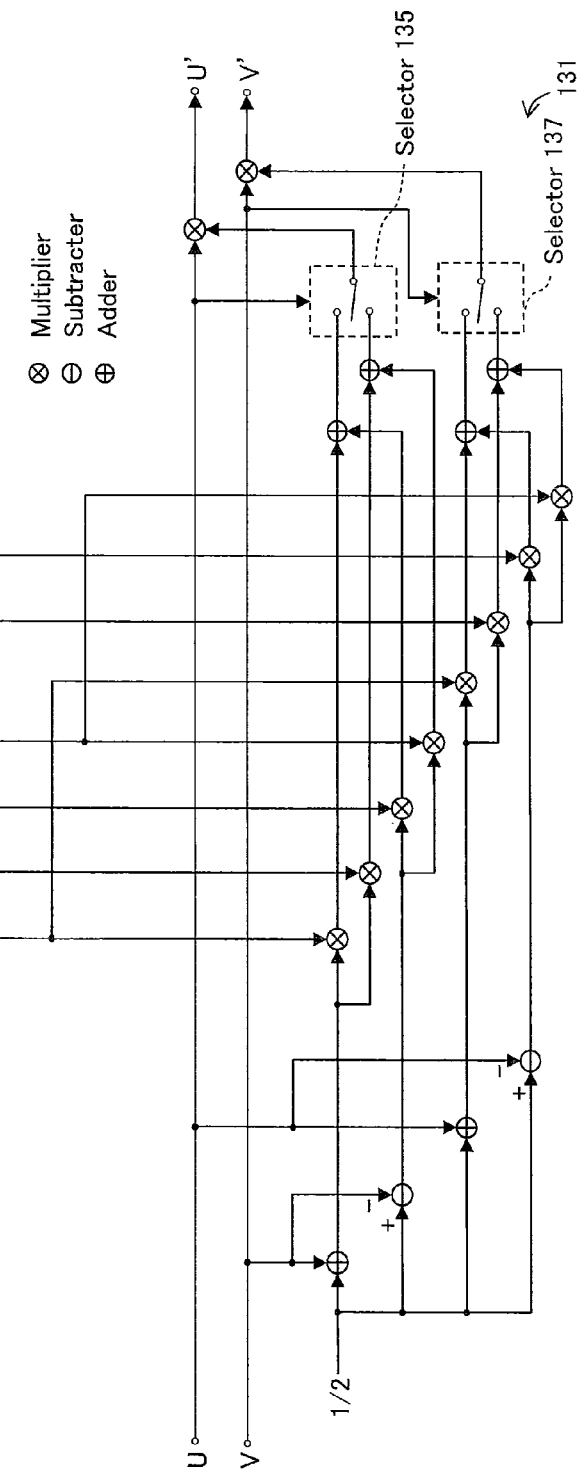

a*b* plane

Parameters and directions

COLOR ADJUSTMENT CIRCUIT

TECHNICAL FIELD

The present invention relates to a color adjustment circuit and to an electronic device using the same.

BACKGROUND ART

In recent years, a portable electronic device, such as a mobile terminal for example, has been made capable of color display with an increasingly higher degree of definition. Accordingly, viewing of various contents has been made possible with a mobile terminal.

Conventionally, various color adjustment techniques have been proposed. For example, in a technique described in Patent Document 1 below, a degree of freedom for hue-matrix correction is increased by performing the correction on any selected hues independently. According to this technique, a shifted monochromatic color is corrected to proper UV values that the color should have, and comprehensive color reproducibility can thus be obtained.

[Patent Document 1] Japanese Patent Application Publication No. Sho 61-19292: Hue Matrix Correction Circuit

DISCLOSURE OF THE INVENTION

Problems to be Solved by the Invention

However, in the technique described in Patent Document 1 above, as shown in FIG. 8 of the patent document, correction is performed in a Cr(R-Y) direction in order to correct a shift of yellow, and correction is performed in a Cr(R-Y) direction also in order to correct a shift of blue. In other words, in this technique, color correction mainly involves correction of hues, and color shifts are corrected by setting multiple constants properly. Another problem of this technique is that, with multiple constants being involved, correspondence between what values are set for all the respective constants and what kind of color is obtained by correction is unclear.

An objective of the present invention is to provide a technique that allows more easy color adjustment.

Means for Solving the Problems

A color adjustment technique of the present invention mainly involves not correction of hues, but correction of darkness levels of colors. In other words, the objective is not to correct shifts, but to shift colors on purpose.

Further, the present invention corrects the darkness levels of colors, and therefore a direction of correction for a target color is different from that in the conventional technique. In the present invention, there is a one-on-one relationship between a parameter and a color targeted for transformation.

Moreover, each of the darkness level can be set so as to increase/decrease with an increase/decrease of a parameter.

According to one aspect of the present invention, provided is a color adjustment device for adjusting a color on a color plane being defined by two mutually orthogonal axes (hereinafter referred to as X and Y axes) and including no brightness, the color adjustment device characterized by including a color adjustor that performs color adjustment on at least any one of colors RGBCMYe in only one of directions of the X and Y axes.

The above device performs transformation regardless of brightness, for example, by using a color-difference value. A color having no influence on brightness can be exclusively adjusted. Note that the present invention can be applied to color spaces other than the YUV space, and can be applied to a color space of, for example, YCbCr, YPbPr, YIQ, L*u*v*, L*a*b*, or the like.

Further, in adjusting R on the UV plane, R is adjusted using only a value of V. This allows adjustment of an intensity of an intended color with a reduced amount of calculation. Note that, in RGBCMYe, this is also applicable to BCYe with a similar way of thinking (adjustment using only a value of either U or V).

It is preferable that the color adjustor define color adjustment parameters for colors each designated as having an intensity in a particular direction on the XY plane, and performs color intensity adjustment by using the adjustment parameters. It is preferable that the color adjustor transform data of the X and Y by using the color adjustment parameters. It is preferable that, when plural colors are included, the color adjustor perform color adjustment by excluding a color component having a small influence on the X axis and the Y axis. For example, color transformation using only R and M is performed by ignoring a component (Ye: yellow) having a small influence on the V axis (Ye having a relatively smallest influence among RMYe is ignored). Thereby, adjustment of an intended color can be achieved with a reduced amount of calculation. It is preferable that at least any one of the color adjustment parameters be defined as being parallel to a direction of at least any one of the X axis and the Y axis.

It is preferable that the at least any one of the color adjustment parameters be defined as having an angle of any one of 45°, 135°, 225°, and 315° with respect to the direction of the X axis. It is preferable that, when transforming the data of the X and Y by using the color adjustment parameters, the color adjustor switch the color adjustment parameters in accordance with whether the data of the X and Y, respectively, are positive or negative. Additionally, the color adjustment device is characterized in that a direction of color transformation for color adjustment on the XY plane is along at least any one of the X axis and the Y axis. For example, color-difference data UV is transformed by defining parameters having intensities in particular directions in a YUV space and corresponding to designated colors, and by switching these parameters according to whether UV values are positive or negative. Parameters correspond one-to-one with colors, and therefore a color intensity corresponding to a designated color can be changed only by increasing or decreasing the parameter. This allows easy user settings and soft control.

The color adjustment device is characterized in that the color adjustor adjusts, in view of input and output characteristics, a color targeted for transformation in such a manner that the larger an input value of the color, the larger a rate of change of an output value thereof in data after color transformation. Additionally, the color adjustment device is characterized in that, in data after color transformation, the color adjustor adjusts, in view of input and output characteristics, a color targeted for transformation: in such a manner as to decrease or not to change an intensity of an output value of a color other than the color targeted for transformation when increasing an intensity of the color targeted for transformation; and in such a manner as to increase or not to change an intensity of the output value of the color other than the color targeted for transformation when decreasing an intensity of the color targeted for transformation. For example, when, with R being set as a transformation target among colors of RGB, the color adjustment parameters are set and transformation is performed to increase color intensity (value increase) by using set color adjustment parameters, a transformation result of each of G and B, which are not the transformation targets, exhibits an intensity decrease (reduction)

or no intensity change, and does not exhibit an intensity increase (value increase) at all. Further, the color adjustment device is characterized in that, when the color adjustment parameter is set in order to change a color targeted for transformation, the color adjustor adjusts the color in such a manner that, on the XY plane, a change amount of a color apart from the color targeted for transformation is smaller than a change amount of the color targeted for transformation. Thereby, a degree by which a color to be transformed is changed can be increased (a degree by which a color not to be transformed is changed can be decreased). For example, when data is close to red, red is emphasized. Accordingly, transformation is performed so as to "make a reddish color red" and so as to "cause little change in a non-reddish color."

When a same value is set for each of the color adjustment parameters of individual colors, the color adjustor can perform adjustment also in such a manner that change amounts of output values after color transformation are equal to each other. Additionally provided is the above described color adjustment device characterized by including: a register that stores therein the color adjustment parameters; a selector that makes a selection among the color adjustment parameters; and a multiplier that multiplies the color adjustment parameter selected by the selector by input values of the X and Y.

The present invention may be a mobile terminal or a display device characterized by including a video signal processor including any one of the above described color adjustment devices. Additionally, the present invention may be the mobile terminal that is: characterized by including a memory that saves data obtained by the video signal processor through transformation; and characterized in that the memory saves the data, which is obtained through transformation by the color adjustment device, and a set value of the color adjustment parameter in association with each other. The present invention may be the mobile terminal characterized by including an external connection terminal and a radio communicator that are capable of transmitting and/or receiving: data obtained through transformation by the color adjustment device; and the color adjustment parameters.

It is preferable that the mobile terminal include a user interface capable of changing set values of the color adjustment parameters. The present invention may be a system by which data and a set value of the color adjustment parameter, which are obtained through transformation by the color adjustment device, are allowed to be transmitted and/or received among plural mobile terminals.

A system may be configured so that, while a set value of the color adjustment parameter may be assigned to a content, color adjustment may be performed based on the set value in conjunction with reproduction of the content.

According to one aspect of the present invention, provided is a color adjustment method for performing color adjustment on a color plane being defined by two mutually orthogonal axes (hereinafter referred to as X and Y axes) and including no brightness, the color adjustment method characterized by including a step of performing color adjustment on at least any one of colors RGBCMYe in only one of directions of the X and Y axes, the step including: defining a color adjustment parameter for a color designated as having an intensity in a particular direction on the XY plane; and performing color intensity adjustment by using the adjustment parameter.

The present invention may be a program for causing a computer to execute the above described step. The present invention may be a computer-readable recording medium that records therein the program. Note that this program may be acquirable by a transmission medium.

Effects of the Invention

The present invention allows easy adjustment of color intensities. This accordingly allows reduction in load of color transformation processing for display in a mobile terminal or the like.

BRIEF DESCRIPTION OF THE DRAWINGS

FIG. 1 is a diagram showing a distribution of primary colors on a UV plane.

FIG. 2 is a diagram showing an example of adjustment parameters for primary colors.

FIG. 3 is a diagram showing a distribution of primary and complementary colors on the UV plane.

FIG. 4 is a diagram showing an example of adjustment parameters for primary and complementary colors.

FIG. 5 is a diagram showing an example of how colors are transformed by color intensity processing.

FIG. 6 is a diagram showing an example of transformation obtained when an influence on a color other than a color to be increased or decreased in intensity is reduced.

FIG. 7 is a diagram showing input/output characteristics showing an example of color transformation obtained by increasing and decreasing the intensity of monochromatic R.

FIG. 8 is a diagram showing input/output characteristics showing an example of color transformation obtained by increasing and decreasing the intensity of monochromatic G.

FIG. 9 is a diagram showing input/output characteristics showing an example of color transformation obtained by increasing and decreasing the intensity of monochromatic B.

FIG. 10 is a diagram showing input/output characteristics showing an example of color transformation obtained by increasing the intensity of non-monochromatic R.

FIG. 11 is a diagram showing input/output characteristics showing an example of color transformation obtained by decreasing the intensity of non-monochromatic R.

FIG. 12 is a diagram showing input/output characteristics showing an example of color transformation obtained by increasing the intensity of non-monochromatic R.

FIG. 13 is a diagram showing input/output characteristics showing an example of color transformation obtained by decreasing the intensity of non-monochromatic R.

FIG. 14 is a diagram showing input/output characteristics showing an example of color transformation obtained by increasing the intensity of non-monochromatic G.

FIG. 11 is a diagram showing input/output characteristics showing an example of color transformation obtained by decreasing the intensity of non-monochromatic G.

FIG. 11 is a diagram showing input/output characteristics showing an example of color transformation obtained by increasing the intensity of non-monochromatic B.

FIG. 11 is a diagram showing input/output characteristics showing an example of color transformation obtained by decreasing the intensity of non-monochromatic B.

FIG. 18 is a diagram showing a configuration example of a display device using color adjustment technique according to any one of present embodiments.

FIG. 19 is a diagram showing a configuration example of a mobile terminal using the color adjustment technique according to any one of the present embodiments.

FIG. 20 is a diagram showing a configuration example of an outer appearance of the mobile terminal according to any one of the present embodiments.

FIG. 21 is a diagram showing a processing example in a first usage scene for color display of the mobile terminal.

FIG. 22 is a diagram showing a configuration example of a system that performs color adjustment for multiple mobile terminals by using the color adjustment technique according to any one of the present embodiments.

FIG. 23 is a diagram showing a flow of processing performed by a video signal processor.

FIG. 24 is a diagram showing an overview of color adjustment processing according to a first embodiment of the present invention.

[FIG. 25] FIG. 25 is a diagram showing an overview of first color adjustment processing according to a second embodiment of the present invention.

[FIG. 26] FIG. 26 is a diagram showing an overview of second color adjustment processing according to the second embodiment of the present invention.

[FIG. 27] FIG. 27 is a diagram showing an overview of first color adjustment processing according to a third embodiment of the present invention.

[FIG. 28] FIG. 28 is a diagram showing an overview of second color adjustment processing according to the third embodiment of the present invention.

FIG. 29 shows equations used for the color transformation processing according to the first embodiment and is a diagram showing a configuration example of a circuit based thereon.

FIG. 30 shows equations used for the color transformation processing according to the second embodiment and is a diagram showing a configuration example of a circuit based thereon.

[FIG. 31] FIG. 31 shows equations used for the color transformation processing according to the second embodiment and is a diagram showing a configuration example of a circuit based thereon.

FIG. 32 is a diagram showing a CbCr plane.
FIG. 33 is a diagram showing a PbPr space.
FIG. 34 is a diagram showing an IQ plane.
FIG. 35 is a diagram showing a u*v* plane.
FIG. 36 is a diagram showing an a*b plane.
FIG. 37 is a diagram showing adjustment parameters and directions thereof of respective colors on an a*b* plane.

DESCRIPTION OF SYMBOLS

A . . . mobile terminal, B . . . display device, 1 . . . operation part, 2 . . . antenna, 3, 3a, 3b . . . radio communicator, 5 . . . camera, 11 . . . register, 15 . . . TV receiver, 17 . . . memory, 21 . . . external memory I/F, 25 . . . video signal processor, 27 . . . display, 31 . . . controller, 33 . . . image corrector, 35 . . . color adjustor, 37 . . . RGBYUV transformer, 41 . . . gamma corrector, 43 . . . external connection terminal, 51 . . . menu display, 53 . . . color adjustment, 55 . . . current set values, 61 . . . tower, 63 . . . One-Seg, 65 . . . network, 71 . . . server

BEST MODES FOR CARRYING OUT THE INVENTION

In this description, Y is a brightness signal; U is a color-difference signal (B-Y), which is set in the range of $-\frac{1}{2}$ to $\frac{1}{2}$; and V is a color-difference signal (R-Y), which is set in the range of $-\frac{1}{2}$ to $\frac{1}{2}$. In addition, RGBCMYe are red, green, blue, cyan, magenda, and yellow, respectively, each of which is set in the range of 0 to 1. Further, a darkness level of a color is defined as follows. Specifically, a darkness level of a color is obtained by adding the squares of respective color components (color differences or chromaticity levels) and finding the square root of the result. A darkness level of a color is defined by the following equation, for example, in the case of a YUV space. In this description, the color is lighter or weaker with a smaller value being found, and is darker or more intense with a larger value.

Darkness level of color=$(U^2+V^2)^{1/2}$

With reference to the drawings, color adjustment techniques according to embodiments of the present invention will be described below.

(First Embodiment)

Figure 1:
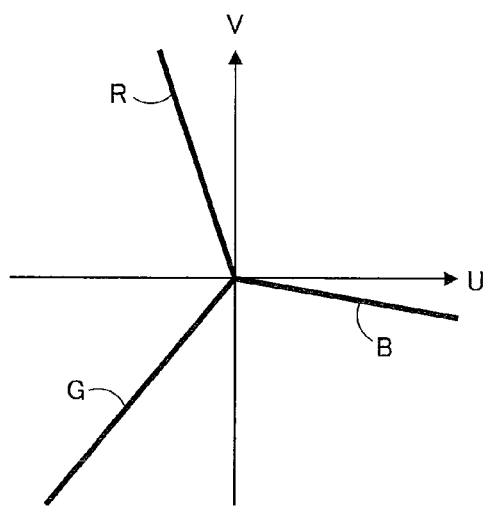
[FIG. 1]

FIG. 1 is a diagram illustrating a first principle of a color adjustment technique according to the present embodiment, and is a diagram showing a distribution of three primary colors R, G, and B on a UV plane. A case of RGB is described here, but the technique is similarly applicable also to CMYe. Within the UV plane, monochromatic colors RGB distribute almost as shown in FIG. 1. According to "NHK Television Technology Textbook (vol. 1) published in 1989," in a color-television signal used in the NTSC method, R has an angle of 103.5°, G has an angle of 240.6°, and B has an angle of 347.6°, with respect to the U axis.

The inventors noted that, in FIG. 1, B is close to the U axis, and R is close to the V axis.

Figure 2:
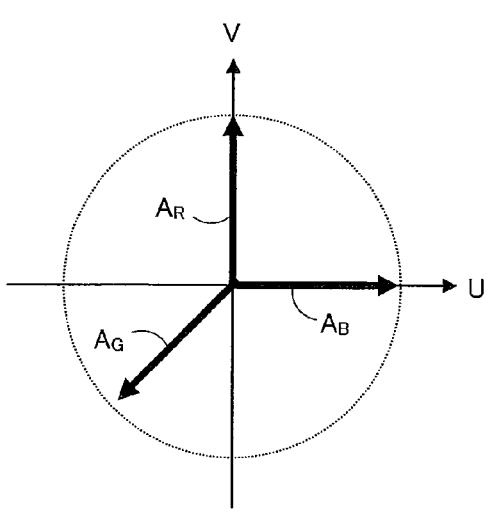
[FIG. 2]

FIG. 2 is a diagram showing, focusing on this point, an example of color adjustment parameters that are along the directions of the respective colors. As can be seen from FIG. 2, when inputted V is in the negative range for example, B has a small influence. Accordingly, calculation for a B component is omitted to reduce the calculation amount. Similarly, components having small influences when V is in the positive range, when U is in the positive range, and when U is in the negative range are omitted. With R being set in the V-axis direction and B being set in the U-axis direction, adjustment parameters $A_R$, $A_G$, and $A_B$ set in directions as shown in the drawing can be defined. Here, $A_G$ is defined assuming that G receives transformation influences of an equal degree in both the U and V axes. $A_G$ is defined as having an angle of 225° with respect to the U axis.

When inputted V is in the positive range, a V component can be adjusted by multiplying $A_R$ by inputted V (see Equation 1).

[Expression 1]

Example of adjustment when V is positive $$V' = A_R \cdot V \qquad (1)$$

Similar processing can also be performed when inputted V is in the negative range, when U is in the positive range, and when U is in the negative range. On that basis, Equation 2 is obtained.

[Expression 2]

Example of conversion equation for RGB adjustment (2)

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

$$\alpha = \begin{cases} A_B & (U \geq 0) \\ A_G & (U < 0) \end{cases}$$

$$\beta = \begin{cases} A_R & (V \geq 0) \\ A_G & (V < 0) \end{cases}$$

$U = V = O$ only need to be included in either one.

By setting values of the adjustment parameters for respective RGB larger than 1 or smaller than 1 in the above equation, color transformation processing for adjusting darkness/lightness of a color can be performed, independently of a brightness, so as to bring UV values close toward a color component which is to be increased or decreased in intensity.

The above-described color adjustment has an advantage of reducing the amount of calculation by omitting calculation for a component having a small influence.

(Second Embodiment)

In contrast to the color adjustment technique according to the first embodiment above, in a technique according to the present embodiment, influences to colors other than a color to be increased or decreased in intensity is reduced. For example, when $A_R$ is defined as shown in the first embodiment, R has an influence in the negative direction of U. Accordingly, in consideration of that, to define $A_R$ more properly, an influence thereof in the positive direction of U is preferably reduced. Thus, when inputted V is in the positive range, a weighted average is obtained for a fixed value 1 and $A_R$ by using a value of U, and the value thus obtained is multiplied by inputted V. Thereby, the V component is adjusted in such a manner as to give small influences on colors other than a particular color (Equation 3). Two equations are given as examples here.

[Expression 3]

Examples of adjustment when V is positive $$\text{Example 1} \quad V'=((S+U)+(T-U)\cdot A_R)\cdot V \quad (3\text{-}1)$$

S+T=1 is satisfied $$\text{Example 2} \quad V'=(P(U)+Q(U)\cdot A_R)\cdot V \quad (3\text{-}2)$$

P and Q are functions of U, and P(U)+Q(U)=1 is satisfied.

Similar processing is also performed when inputted V is in the negative range, when U is in the positive range, and when U is in the negative range. Then, Equation 4 is obtained. Two equations are given as examples here as well.

[Expression 4]

Examples of conversion equations for RGB adjustment (4-1)

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 1 (4-2)

$$\alpha = \begin{cases} (S1+V)+(T1-V)\cdot A_B & (U \geq 0) \\ (S2+V)+(T2-V)\cdot A_G & (U < 0) \end{cases}$$

$$\beta = \begin{cases} (S3+U)+(T3-U)\cdot A_R & (V \geq 0) \\ (S4+U)+(T4-U)\cdot A_G & (V < 0) \end{cases}$$

$S1+T1=1$, $S2+T2=1$, $S3+T3=1$, and $S4+T4=1$ are satisfied, respectively.

Example 2 (4-3)

$$\alpha = \begin{cases} P1(V)+Q1(V)\cdot A_B & (U \geq 0) \\ P2(V)+Q2(V)\cdot A_G & (U < 0) \end{cases}$$

$$\beta = \begin{cases} P3(U)+Q3(U)\cdot A_R & (V \geq 0) \\ P4(U)+Q4(U)\cdot A_G & (V < 0) \end{cases}$$

P and Q are functions of U, and $P1(V)+Q1(V)=1$, $P2(U)+Q2(U)=1$, $P3(V)+Q3(V)=1$, $P4(U)+Q4(U)=1$ are satisfied, respectively.

$U=V=0$ only needs to be included in either one.

A value more than 1 is set for any one of RGB adjustment parameters in order to increase the intensity thereof, and a value less than 1 is set therefor in order to decrease the intensity thereof. Thereby, values of UV can be changed while reducing influences to colors other than a particular color.

(Third Embodiment)

In contrast to the color adjustment technique according to the first embodiment above, a technique according to the present embodiment is characterized in that colors of RGB-CMYe are adjusted while reducing influences to colors other than a color to be increased or decreased in intensity.

Figure 3:
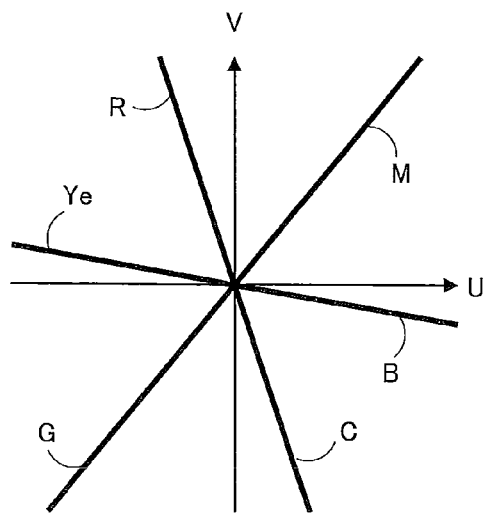
[FIG. 3]

In the UV plane, colors of respective RGBCMYe distribute in directions almost as shown in FIG. 3.

According to "NHK Television Technology Textbook (vol. 1) published in 1989" mentioned earlier, in a color-television signal used in the NTSC method, R has an angle of 103.5°, G has an angle of 240.6°, B has an angle of 347.6°, C has an angle of 283.5°, M has an angle of 60.6°, and Ye has an angle of 167.6°, with respect to the U axis.

The inventors noted that, in FIG. 3, B and Ye are close to the U axis, and R and C are close to the V axis.

Here, an adjustment parameter for each color in accordance with the direction of the color is considered.

Figure 4:
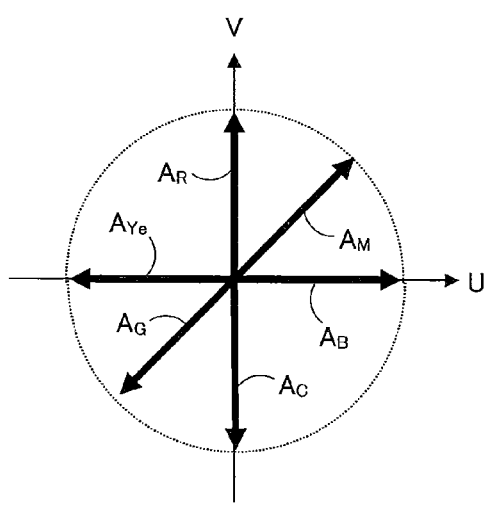
[FIG. 4]

For example, when inputted V is in the positive range, Ye has a small influence. Accordingly, a Ye component is omitted from calculation in order to reduce a calculation amount. Similarly, components having small influences are omitted when V is in the negative range, when U is in the positive range, and when U is in the negative range. With R and C being in the V-axis direction and B and Ye being in the U-axis direction, adjustment parameters $A_R$, $A_G$, $A_B$, $A_C$, $A_M$, and $A_{Ye}$ as shown in FIG. 4 can be defined. Here, $A_G$ and $A_M$ are defined assuming that G and M have equal degrees of transformation influence in both the U and V axes. $A_G$ is defined as having an angle of 225° with respect to the U axis, and $A_M$ is defined as having an angle of 45° with respect to the U axis.

As in the first embodiment, influences to other colors are considered. Specifically, when inputted V is in the positive range, a weighted average is obtained for $A_R$ and $A_M$ by using a value of U, and the value thus obtained is multiplied by inputted V. Thereby, the V component can be adjusted (Equation 5). Two equations are given as examples here.

[Expression 5]

Examples of adjustment when V is positive $$\text{Example 1} \quad V'=((S+U)\cdot A_M+(T-U)\cdot A_R)\cdot V \quad (5\text{-}1)$$

S+T=1 is satisfied $$\text{Example 2} \quad V'=(P(U)\cdot A_M+Q(U)\cdot A_R)\cdot V \quad (5\text{-}2)$$

P and Q are functions of U, and P(U)+Q(U)=1 is satisfied.

In addition, similar processing is performed when inputted V is in the negative range, when U is in the positive range, and when U is in the negative range. Then, Equation 6 is obtained. Two examples are given as Equation 6.

[Expression 6]

Examples of conversion equation for RGBCMYe adjustment (6-1)

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 1 (6-2)

$$\alpha = \begin{cases} (S1+V) \cdot A_M + (T1-V) \cdot A_B & (U \geq 0) \\ (S2+V) \cdot A_{Ye} + (T2-V) \cdot A_G & (U < 0) \end{cases}$$

$$\beta = \begin{cases} (S3+U) \cdot A_M + (T3-U) \cdot A_R & (V \geq 0) \\ (S4+U) \cdot A_C + (T4-U) \cdot A_G & (V < 0) \end{cases}$$

$S1 + T1 = 1, S2 + T2 = 1, S3 + T3 = 1,$
and $S4 + T4 = 1$ are satisfied, respectively.

Example 2 (6-3)

$$\alpha = \begin{cases} P1(V) \cdot A_M + Q1(V) \cdot A_B & (U \geq 0) \\ P2(V) \cdot A_{Ye} + Q2(V) \cdot A_G & (U < 0) \end{cases}$$

$$\beta = \begin{cases} P3(U) \cdot A_M + Q3(U) \cdot A_R & (V \geq 0) \\ P4(U) \cdot A_C + Q4(U) \cdot A_G & (V < 0) \end{cases}$$

$P$ and $Q$ are functions of $U$,
and $P1(V) + Q1(V) = 1, P2(U) + Q2(U) = 1,$
$P3(V) + Q3(V) = 1, P4(U) + Q4(U) = 1$ are satisfied, respectively.
$U = V = 0$ only needs to be included in either one.

A value more than 1 is set for any one of the RGBCMYe adjustment parameters in order to increase the intensity thereof, and a value less than 1 is set therefor in order to decrease the intensity thereof. Thereby, values of UV can be changed while reducing influences to colors other than a particular color.

Figure 5:
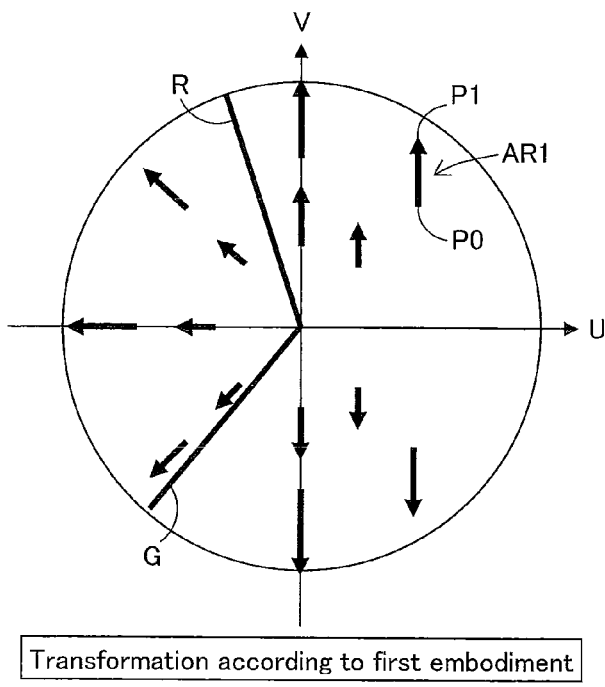
[FIG. 5]

With reference to the drawings, description will be given below of a first transformation example for performing color transformation using the techniques of the first embodiment and the third embodiment. FIG. 5 is a diagram showing how R, G, and B are transformed on the UV plane when the color transformation is performed using the color adjustment technique (using Equation 2) according to the first embodiment. $A_R = A_G = 1.5$ are given as adjustment parameters, which means that the first transformation example is an example in which red and green are emphasized.

A start point P0 of an arrow AR1, for example, indicates a position before the transformation, and an end point P1 of the arrow indicates a position after the transformation. The axis length of the arrow represents the magnitude of the transformation. As FIG. 5 shows, R which is a color to be emphasized is emphasized along the V axis, and G which is another color to be emphasized is emphasized in a direction of U,V<0.

Figure 6:
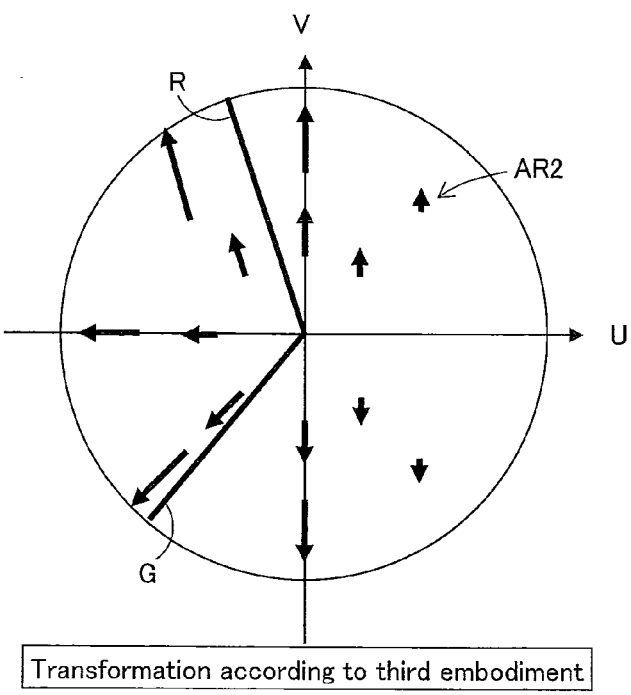
[FIG. 6]

Next, with reference to FIG. 6, description will be given of an example using both of the above first transformation example and the transformation technique of the above third embodiment. FIG. 6 is a diagram showing how R, G, and B are transformed on the UV plane when the adjustment parameters are set as $A_R = A_G = 1.825$ and when R, G, and B are transformed using Equation (7) given below. Equation (7) is obtained by setting all of S1 to S4 and T1 to T4 in Equation (6-2) to ½.

[Expression 7]

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix} \quad (7\text{-}1)$$

$$\alpha = \begin{cases} (1/2+V) \cdot A_M + (1/2-V) \cdot A_B & (U \geq 0) \\ (1/2+V) \cdot A_{Ye} + (1/2-V) \cdot A_G & (U < 0) \end{cases} \quad (7\text{-}2)$$

$$\beta = \begin{cases} (1/2+U) \cdot A_M + (1/2-U) \cdot A_R & (V \geq 0) \\ (1/2+U) \cdot A_C + (1/2-U) \cdot A_G & (V < 0) \end{cases}$$

As can be seen by comparison between AR2 in FIG. 6 and AR1 in FIG. 5, although there is not much change between FIG. 5 and FIG. 6 in how R and G are adjusted, there is a small transformation influence on a color (B) away from R and G being colors to be adjusted (transformed colors). In other words, an influence on a color whose transformation is intended but not desired can be reduced.

Figure 7:
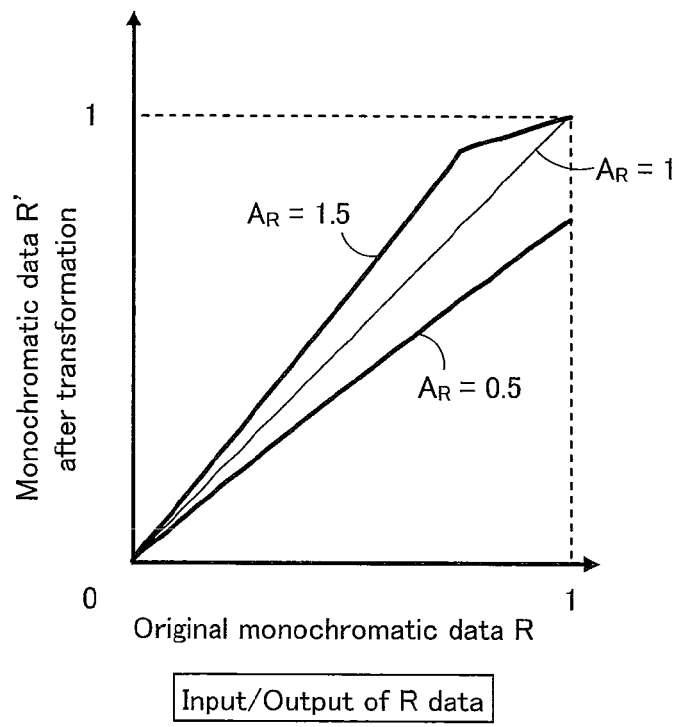
[FIG. 7]
Figure 8:
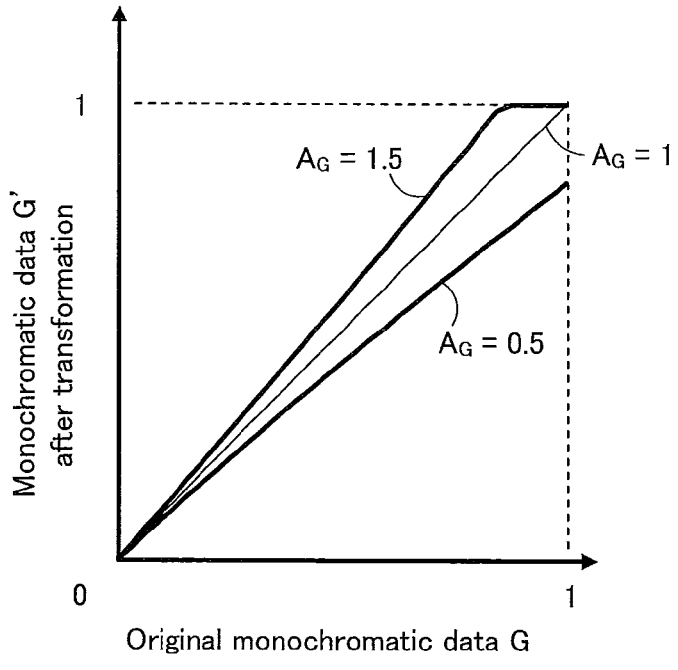
[FIG. 8]
Figure 9:
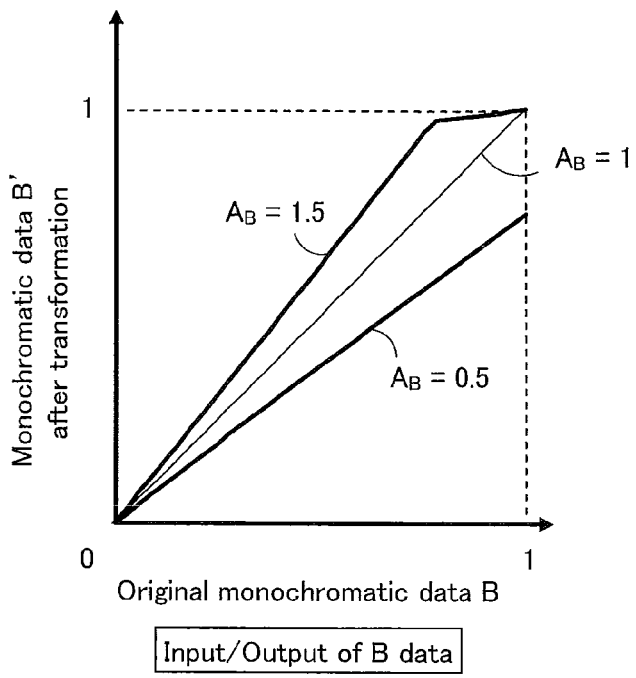
[FIG. 9]

Next, with reference to FIGS. 7 to 9, a second color transformation example will be described. FIGS. 7 to 9 are diagrams showing input/output characteristics of data on monochromatic RGB, respectively, transformed by the method of the above third embodiment and transformed back to RGB data. Table 1 shows equations used for the transformation. Table 1 is a table showing: transformation equations for transforming RGB into YUV (on the left); transformation equations for transforming UV data by using the method of the above third embodiment (in the middle); and transformation equations for transforming YUV into RGB (on the right).

TABLE 1

| [RGB → YUV)] | [Conversion of UV data (the third embodiment)] | [YUV → RGB] |
|---|---|---|
| Y = 0.299R + 0.587G + 0.114B<br>U = -0.169R - 0.331G + 0.5B<br>V = 0.5B - 0.419G - 0.081B | $\begin{bmatrix} U' \\ V' \end{bmatrix} = \begin{bmatrix} \alpha & 0 \\ 0 & \beta \end{bmatrix} \begin{bmatrix} U \\ V \end{bmatrix}$<br><br>$\alpha = \begin{cases} \left(\frac{1}{2}+V\right) \cdot A_M + \left(\frac{1}{2}-V\right) \cdot A_B & (U \geq 0) \\ \left(\frac{1}{2}+V\right) \cdot A_{Ye} + \left(\frac{1}{2}-V\right) \cdot A_G & (U < 0) \end{cases}$<br><br>$\beta = \begin{cases} \left(\frac{1}{2}+U\right) \cdot A_M + \left(\frac{1}{2}-U\right) \cdot A_R & (V \geq 0) \\ \left(\frac{1}{2}+U\right) \cdot A_C + \left(\frac{1}{2}-U\right) \cdot A_G & (V < 0) \end{cases}$ | R' = Y + 1.402V'<br>G' = Y - 0.344U' - 0.714V'<br>B' = Y + 1.772U' |

Note that, although the intensities of RGB differ in magnitude depending on the values of the parameters as shown in FIGS. 7 to 9, the intensities can be changed by changing the values set for the parameters. Here, if the same value is set for the individual parameters and if change amounts obtained by the RGB transformation are to be the same, the transformation may be performed using, for example: Equation (8) if the first embodiment is employed; Equation (9) if the second embodiment is employed; and Equation (10) if the third embodiment is employed.

[Expression 8]

Examples of conversion equation for RGB adjustment (8)

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

$$\alpha = \begin{cases} W_B \cdot A_B & (U \geq 0) \\ W_G \cdot A_G & (U < 0) \end{cases}$$

$$\beta = \begin{cases} W_R \cdot A_R & (V \geq 0) \\ W_G \cdot A_G & (V < 0) \end{cases}$$

Each $W$ indicates a weight $U = V = 0$ only needs to be included in either one.

[Expression 9]

Examples of conversion equation for RGB adjustment (9-1)

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 1 (9-2)

$$\alpha = \begin{cases} (S1+V) + (T1-V) \cdot W_B \cdot A_B & (U \geq 0) \\ (S2+V) + (T2-V) \cdot W_G \cdot A_G & (U < 0) \end{cases}$$

$$\beta = \begin{cases} (S3+U) + (T3-U) \cdot W_R \cdot A_R & (V \geq 0) \\ (S4+U) + (T4-U) \cdot W_G \cdot A_G & (V < 0) \end{cases}$$

$S1 + T1 = 1, S2 + T2 = 1, S3 + T3 = 1$,
and $S4 + T4 = 1$ are satisfied, respectively.

Each $W$ indicates a weight

Example 2 (9-3)

$$\alpha = \begin{cases} P1(V) + Q1(V) \cdot W_B \cdot A_B & (U \geq 0) \\ P2(V) + Q2(V) \cdot W_G \cdot A_G & (U < 0) \end{cases}$$

$$\beta = \begin{cases} P3(U) + Q3(U) \cdot W_R \cdot A_R & (V \geq 0) \\ P4(U) + Q4(U) \cdot W_G \cdot A_G & (V < 0) \end{cases}$$

$P$ and $Q$ are functions of $U$,
and $P1(V) + Q1(V) = 1, P2(U) + Q2(U) = 1$,
$P3(V) + Q3(V) = 1, P4(U) + Q4(U) = 1$ are satisfied, respectively.

Each $W$ indicates a weight $U = V = 0$ only needs to be included in either one.

[Expression 10]

Examples of conversion equation for RGBCMYe adjustment (10-1)

$$\begin{bmatrix} U' \\ V' \end{bmatrix} = \begin{bmatrix} \alpha & 0 \\ 0 & \beta \end{bmatrix} \begin{bmatrix} U \\ V \end{bmatrix}$$

Example 1 (10-2)

$$\alpha = \begin{cases} (S1+V) \cdot W_M \cdot A_M + (T1-V) \cdot W_B \cdot A_B & (U \geq 0) \\ (S2+V) \cdot W_{Ye} \cdot A_{Ye} + (T2-V) \cdot W_G \cdot A_G & (U < 0) \end{cases}$$

$$\beta = \begin{cases} (S3+U) \cdot W_M \cdot A_M + (T3-U) \cdot W_R \cdot A_R & (V \geq 0) \\ (S4+U) \cdot W_C \cdot A_C + (T4-U) \cdot W_G \cdot A_G & (V < 0) \end{cases}$$

$S1 + T1 = 1, S2 + T2 = 1, S3 + T3 = 1$,
and $S4 + T4 = 1$ are satisfied, respectively.

Each $W$ indicates a weight

Example 2 (10-3)

$$\alpha = \begin{cases} P1(V) \cdot W_M \cdot A_M + Q1(V) \cdot W_B \cdot A_B & (U \geq 0) \\ P2(V) \cdot W_{Ye} \cdot A_{Ye} + Q2(V) \cdot W_G \cdot A_G & (U < 0) \end{cases}$$

$$\beta = \begin{cases} P3(U) \cdot W_M \cdot A_M + Q3(U) \cdot W_R \cdot A_R & (V \geq 0) \\ P4(U) \cdot W_C \cdot A_C + Q4(U) \cdot W_G \cdot A_G & (V < 0) \end{cases}$$

$P$ and $Q$ are functions of $U$,
and $P1(V) + Q1(V) = 1, P2(U) + Q2(U) = 1$,
$P3(V) + Q3(V) = 1, P4(U) + Q4(U) = 1$ are satisfied, respectively.

Each $W$ indicates a weight $U = V = 0$ only needs to be included in either one.

FIG. 7 shows an example in which: values of U and V are obtained by changing R from 0 to 1 with $A_R$=1.5 and G and B being 0; UV data transformation is then performed using the UV values thus obtained; and R', G', and B' are calculated using U' and V' obtained thereby. In addition, R', G', and B' are calculated also with $A_R$=0.5 in a similar manner. Similarly, FIG. 8 shows an example in which: values of U and V are obtained by changing G from 0 to 1 with R and B both being 0; UV data transformation is then performed using the UV values thus obtained; and R', G', and B' are calculated using U' and V' obtained thereby. In addition, R', G', and B' are calculated also with $A_G$=0.5 in a similar manner. FIG. 9 shows an example in which: values of U and V are obtained by changing B from 0 to 1 with R and G both being 0; UV data transformation is then performed using the UV values thus obtained; and R', G', and B' are calculated using U' and V' obtained thereby. In addition, R', G', and B' are calculated also with $A_B$=0.5 in a similar manner. As FIGS. 7 to 9 show, for each of colors RGB, color adjustment can be performed on a monochromatic basis using the adjustment parameters, and processing for transforming a darkness/lightness level of a color can be performed according to the present embodiments.

Here, if U' and V' after the transformation using the transformation technique according to the third embodiment overflow, U' and V' are approximated to −½ or ½. Further, RGB after transformation back to the RGB data overflow, RGB are approximated to 1. Such approximation is performed because the drawings of this description are shown with values of U and V being normalized to the range of −½ to ½, and with values of RGB being normalized to the range of 0 to 1. However, if approximation is not performed, somewhat different input/output characteristics are obtained with respect to FIGS. 7 to 9. The same applies to FIGS. 10 to 17 described below.

Next, examples will be described for processing performed, for example, when non-monochromatic R is to be emphasized. The equations shown in Table 1 are used for the transformation here.

Figure 10:
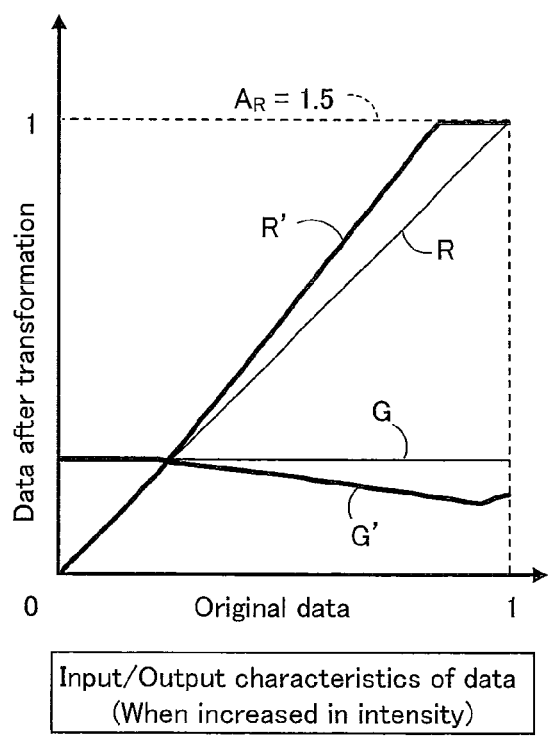
[FIG. 10]

FIG. 10 is a diagram showing relationships between original data and data after transformation of each of G and R, where B is 0. Here, values of U and V are obtained by changing R from 0 to 1 with $A_R$=1.5, G being ¼, and B being 0, UV data transformation is then performed using the UV values thus obtained, and R', G', and B' are calculated using U' and V' obtained thereby. When R ranges from 0 to about ¼, neither R' nor G' exhibits much change. When R is in the range of about ¼ and above, R' and G' are increased and decreased in intensity, respectively, as long as R is changed to 1 or less. Consequently, it can be seen that R is increased in intensity as intended. Note that the reason for a value change with G being near to 1 is that the overflow of a V' value after transformation has been approximated to the range of −½ to ½.

Figure 11:
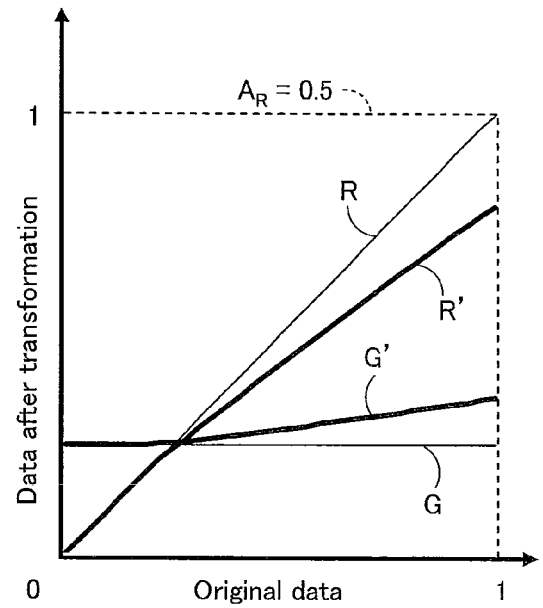
[FIG. 11]

FIG. 11 also is a diagram showing relationships between original data and data after transformation of each of G and R. Here, values of U and V are obtained by changing R from 0 to 1 with $A_R$=0.5, G being ¼, and B being 0, UV data transformation is then performed using the UV values thus obtained, and R', G', and B' are calculated using U' and V' obtained thereby. When R ranges from 0 to about ¼, neither R' nor G' exhibits much change. Where R is changed in the range from about ¼ to 1, R' is decreased in intensity, and G' is increased in intensity. Consequently, it can be seen that R is decreased in intensity as intended.

As described, even when non-monochromatic R is to be increased or decreased in intensity, a color to be transformed can be transformed, as intended, by using the transformation technique according to the third embodiment.

Figure 12:
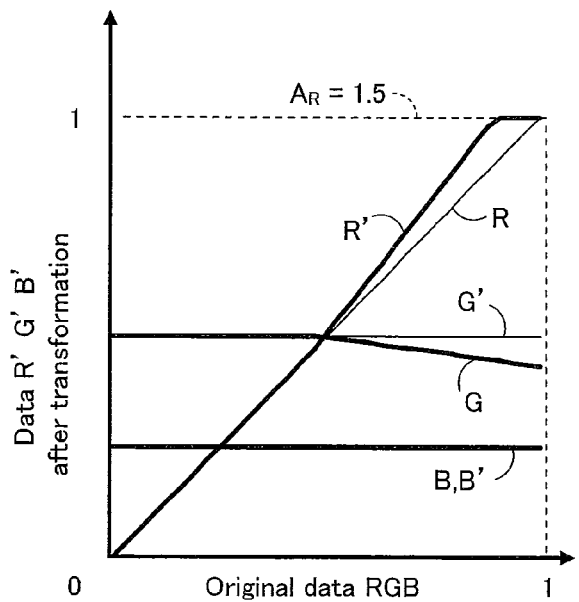
[FIG. 12]
Figure 13:
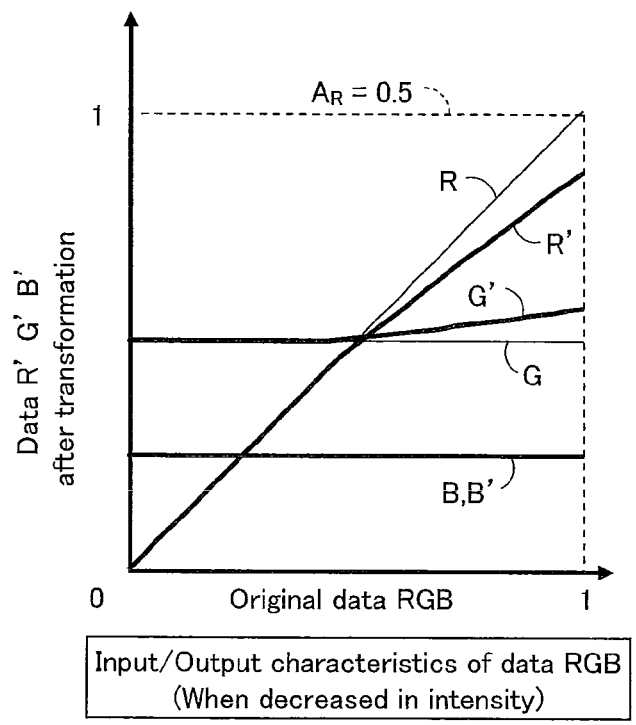
[FIG. 13]

Next, with reference to FIGS. 12 and 13, examples are described in which, for example, non-monochromatic R is increased or decreased in intensity with B being not 0. As in the above examples, the equations shown in Table 1 are used for the transformation processing here.

FIG. 12 is a diagram showing an example in which: values of U and V are obtained by changing R from 0 to 1 with $A_R$=1.5, G being ½, and B being ¼; UV data transformation is then performed using the UV values thus obtained; and R', G', and B' are calculated using U' and V' obtained thereby. As FIG. 12 shows, when R is in a range from 0 to ½, none of R', G' and B' exhibits much change. When R is changed in the range from ½ to 1, R' is increased in intensity, and G' is decreased in intensity. In this way, it can be seen that R is increased in intensity and is transformed as intended. Note that, as for B, almost no change is seen in input/output characteristics.

FIG. 13 is a diagram showing an example in which: values of U and V are obtained by changing R from 0 to 1 with $A_R$=0.5, G being ½, and B being ¼; UV data transformation is then performed using the UV values thus obtained; and R', G', and B' are calculated using U' and V' obtained thereby. Where R ranges from 0 to ¼, neither R', G', nor B' exhibits much change. When R is changed from ¼ to 1, R' is decreased in intensity, and G' is increased in intensity. In this way, it can be seen that R is decreased in intensity as intended. Note that, as for B, almost no change in input/output characteristics is seen.

Figure 14:
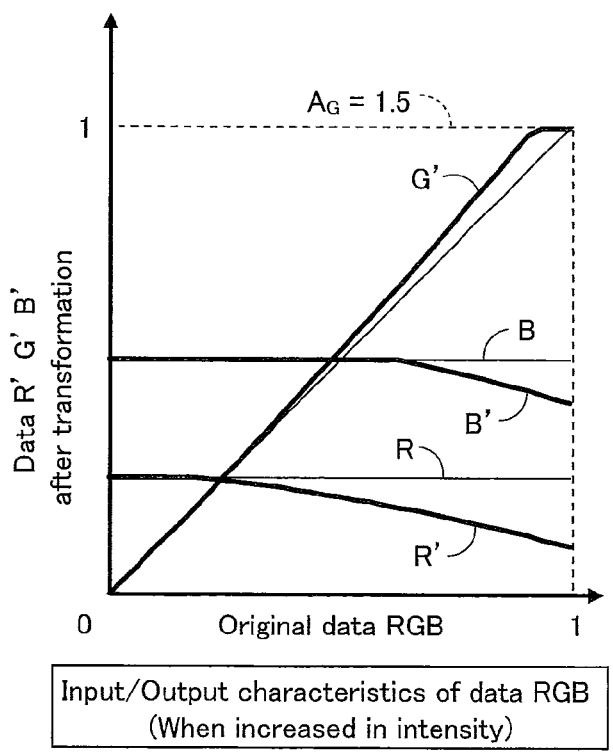
[FIG. 14]

Next, examples are described in which non-monochromatic G is to be increased or decreased in intensity. In FIG. 14, values of U and V are obtained by changing G from 0 to 1 with $A_G$=1.5, B being ½, and R being ¼; UV data transformation is then performed using the UV values thus obtained; and R', G', and B' are calculated using U' and V' obtained thereby. The transformation equations in Table 1 are used. As FIG. 14 shows, R' does not exhibit much change when R ranges from 0 to about ¼, and is decreased in intensity when R is changed in the range from about ¼ to 1. B' does not exhibit much change when B ranges from 0 to ½, and is decreased in intensity when B ranges from ½ to 1. G' does not exhibit much change when G ranges from 0 to about ¼, and is increased in intensity when G is in a range from about ¼ to 1. Consequently, it can be seen that G is increased in intensity as intended.

Figure 15:
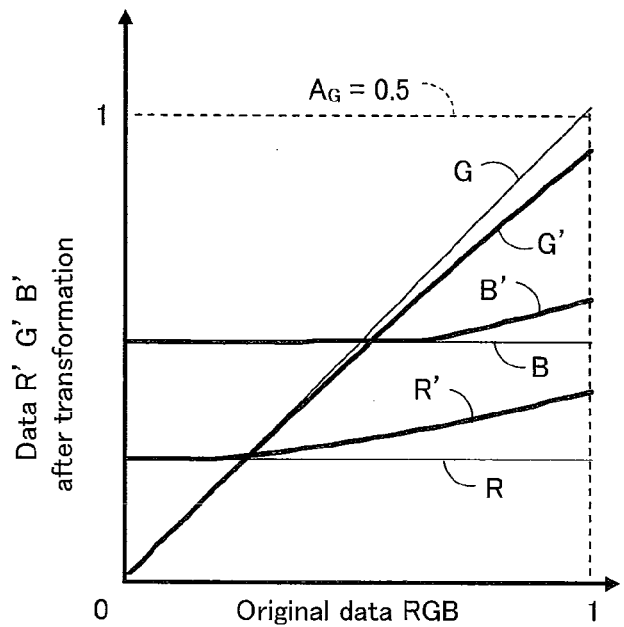
[FIG. 15]

On the other hand, FIG. 15 is a diagram showing a result reached by: obtaining values of U and V by changing G from 0 to 1 with $A_G$=0.5, B being ½, and R being ¼; performing UV data transformation using the UV values thus obtained; and calculating R', G', and B' using obtained U' and V'. As FIG. 15 shows, G' does not exhibit much change in a range where G is from 0 to about ¼, and is decreased in intensity in a range from about ¼ to 1. R' does not exhibit much change when R is from 0 to ¼, and is increased in intensity when R is in a range from ¼ to 1. B' does not exhibit much change when B ranges from 0 to ½, and is increased in intensity in a range from ½ to 1. Consequently, it can be seen that G is decreased in intensity as intended.

Figure 16:
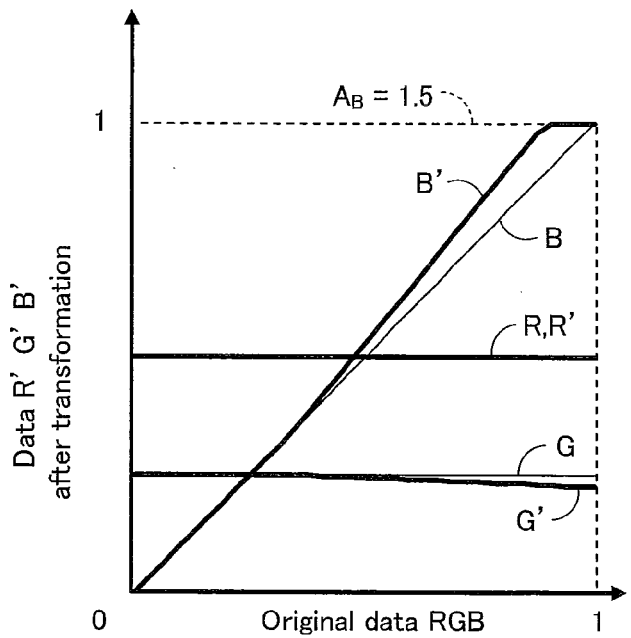
[FIG. 16]
Figure 17:
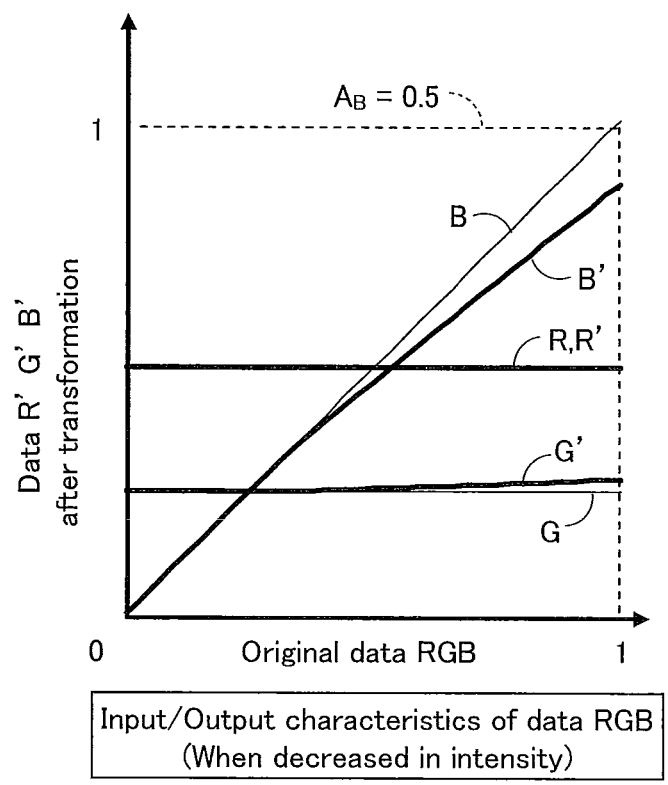
[FIG. 17]

Next, with reference to FIGS. 16 and 17, examples are described in non-monochromatic which B is to be increased or decreased in intensity. The equations shown in Table 1 are used.

FIG. 16 is a diagram showing characteristics in which: values of U and V are obtained by changing B from 0 to 1 with $A_B$=1.5, R being ½, and G being ¼; UV data transformation is then performed using the UV values thus obtained; and R', G', and B' are calculated using obtained U' and V'. B' does not exhibit much change in a range where B is from 0 to ¼, and is increased in intensity in a range from ¼ to 1. G' does not exhibit much change in a range where G is from 0 to ¼, and is decreased in intensity when G is in a range from about ¼ to 1. R' does not exhibit much change when R ranges from 0 to 1. Consequently, it can be seen that G is increased in intensity as intended.

FIG. 17 is a diagram showing characteristics in which: values of U and V are obtained by changing B from 0 to 1 with $A_B$=0.5, R being ½, and G being ¼; UV data transformation is then performed using the UV values thus obtained; and R', G', and B' are calculated using U' and V' obtained thereby. B' does not exhibit much change when B ranges from 0 to ¼, and is decreased in intensity when B ranges from ¼ to 1. G' does not exhibit much change when G ranges from 0 to ¼, and is increased in intensity when G ranges from ¼ to 1. R' does not exhibit much change when R ranges from 0 to 1. Consequently, it can be seen that B is decreased in intensity as intended.

It can be seen from the above that, in the case of RGB, depending on a value set for the color adjustment parameter for a color to be transformed, intensities of the respective colors can be adjusted.

Figure 18:
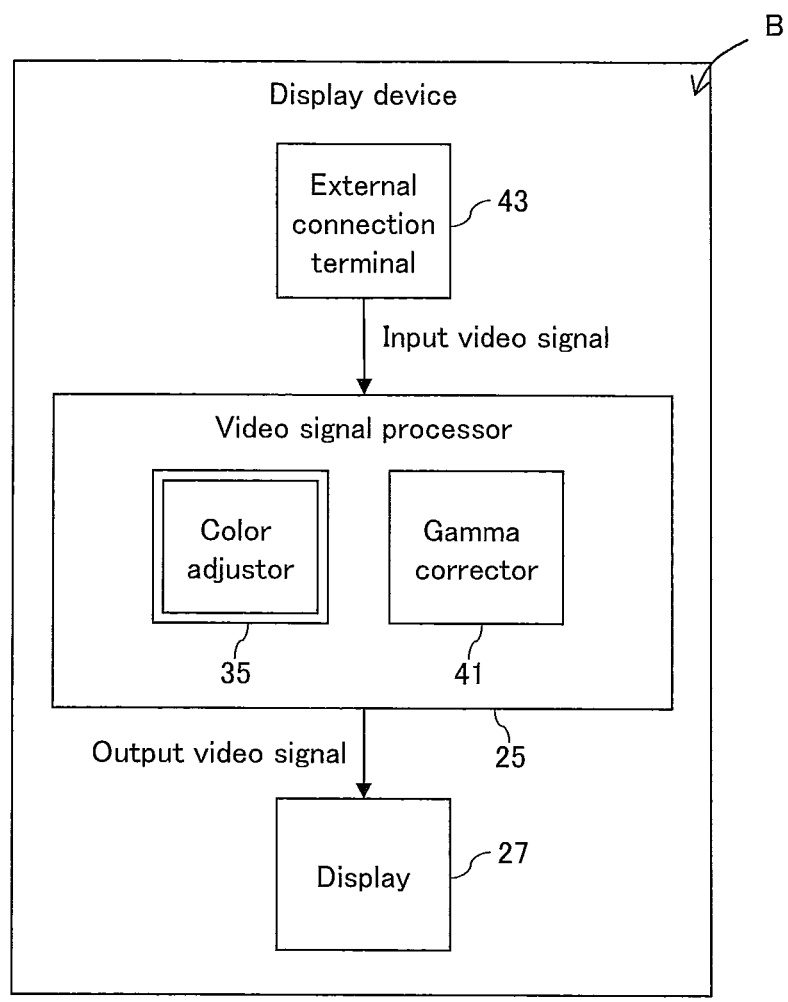
[FIG. 18]

Descriptions will be given below of examples of using the above techniques of adjusting the intensity (darkness/lightness levels) of color for a display device and a mobile terminal. FIG. 18 is a diagram showing a configuration example of a display device using any one of the color adjustment techniques according to the present embodiments. As FIG. 18 shows, a display device B according to the present embodiments has an external connection terminal 43, through which data can be inputted and outputted, a video signal processor 25, and a display 27. The video signal processor 25 includes a color adjustor 35 and a gamma corrector 41. The color adjustor 35 performs the color adjustment according to any one of the above embodiments. The display device in FIG. 18 can be implemented as any one of various devices each having a display, and can be applied to, for example, a liquid crystal display, a plasma display, an OLED (Organic Light Emitting Diode) EL display, and the like.

Figure 19:
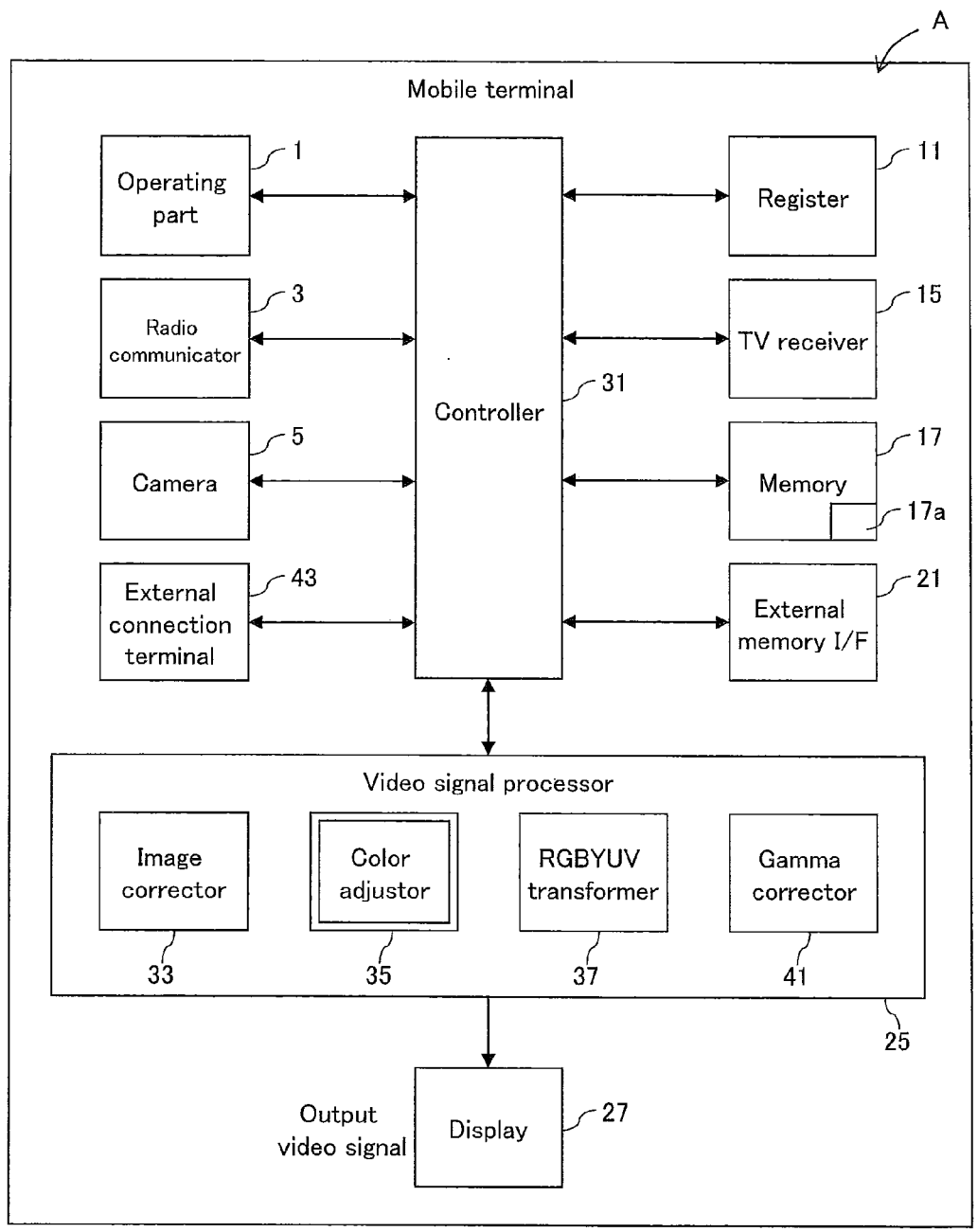
[FIG. 19]

Further, the color adjustment techniques according to the present embodiments allow easy adjustment of color intensities and reduction in load of color transformation processing, and are therefore more suitable for mobile terminals, including mobile phones. FIG. 19 is a diagram showing a configuration example of a mobile terminal using any one of the color adjustment techniques according to the present embodiments. As FIG. 19 shows, a mobile terminal A according to the present embodiments has an operation part 1, a radio communicator 3, a camera 5, the external connection terminal 43 capable of data input and output, a register 11, a TV receiver 15, a memory 17, an external memory I/F 21, the video signal processor 25, the display 27, and a controller (CPU) 31 for overall control. The video signal processor 25 includes an image corrector 33, the color adjuster 35, an RGBYUV transformer 37, and the gamma corrector 41. The color adjustor 35 performs the color adjustment according to any one of the above embodiments.

Figure 20:
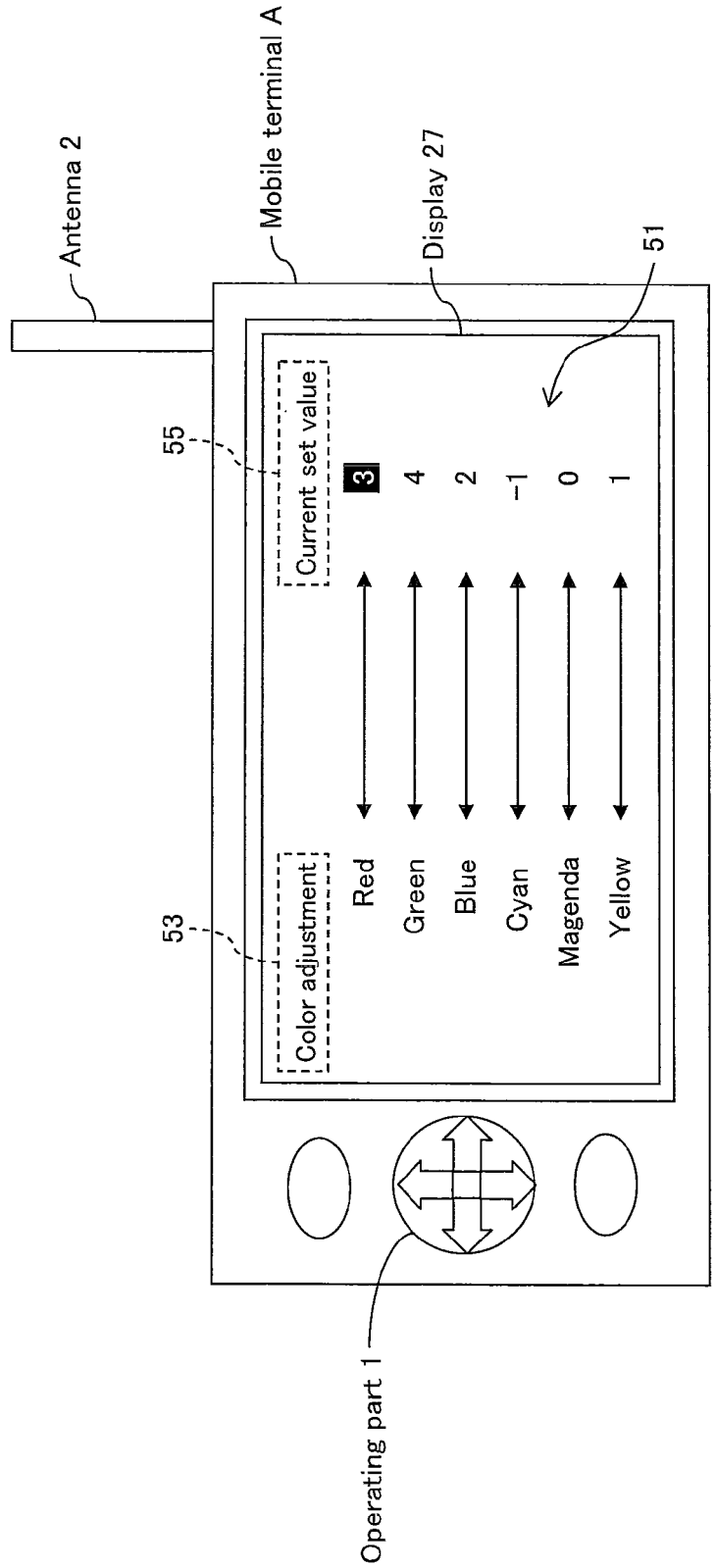
[FIG. 20]

FIG. 20 is a diagram showing a configuration example of an outer appearance of the mobile terminal. As FIG. 20 shows, a menu display 51 for color adjustment 53 is displayed on the display 27. Items for the color adjustment 53 and current set values 55 are shown, and the set value for red (R) is currently being focused. Here, the mobile terminal may be configured so that the set values 55 for the color adjustment 53 displayed on the display 27 can be changed using the operation part 1 (the drawing shows how red is adjusted). Alternatively, the mobile terminal may be configured so that the set values 55 can be adjusted by the terminal manufacturer side before shipment for such a purpose as elimination of individual differences.

Figure 21:
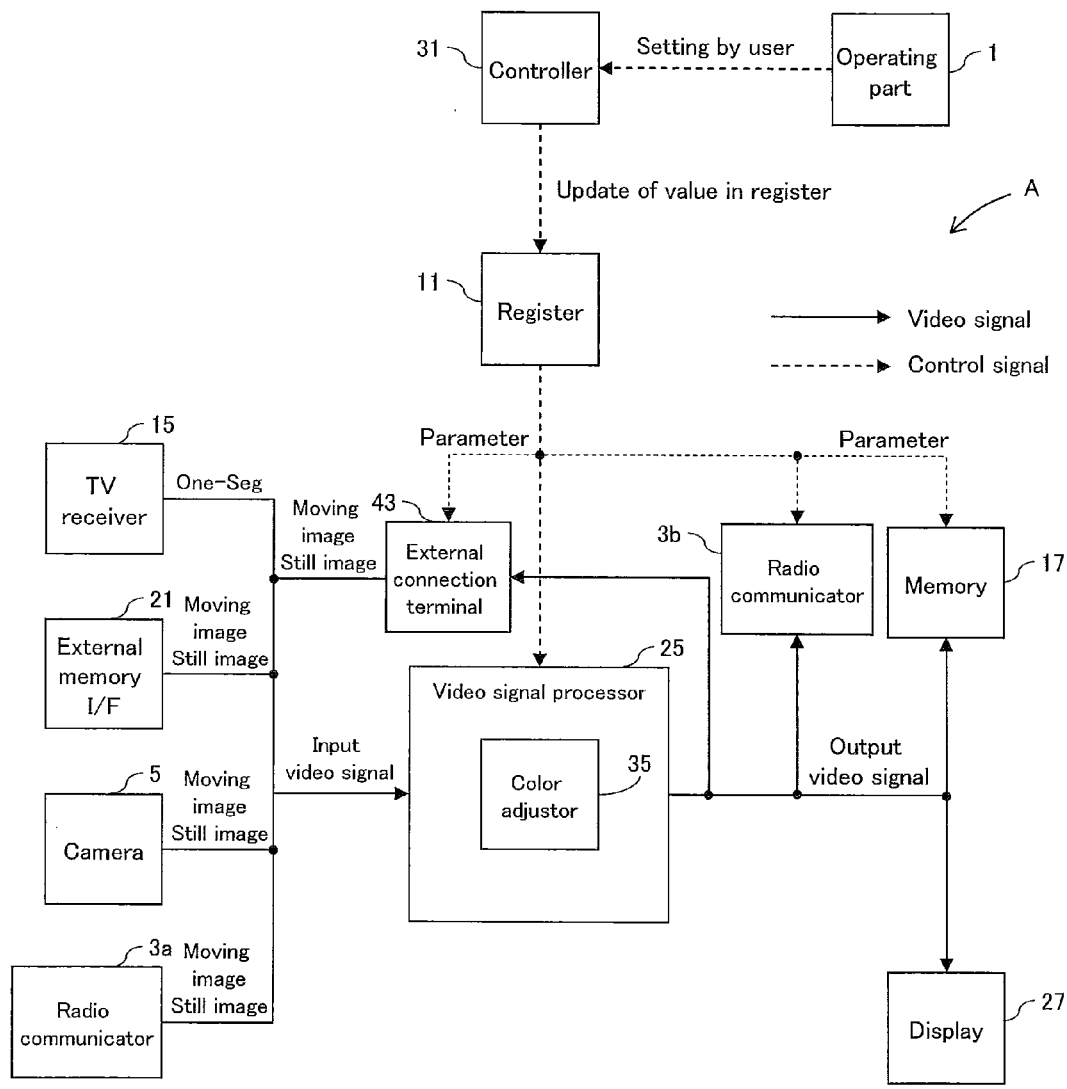
[FIG. 21]

FIG. 21 is a diagram showing a processing example in a first usage scene for color display of the mobile terminal. As FIG. 21 shows, as an input video signal, the video signal processor 25 receives input of a video or a still image acquired from a radio communicator 3a, the camera 5, the external memory I/F 21, or the external connection terminal 43, or a video based on One-Seg broadcasting acquired from the TV receiver 15. Then, the color adjustor 35 performs color adjustment. For this color adjustment, settings are made through user operation from the operation part 1, the controller 31 receives the operation, and thus values currently set in the register 11 can be changed. Parameters thus modified are used in the color adjustment by the color adjustor 35. Based on a video signal obtained by the color adjustment, an output video signal is displayed on the display 27. An image of a communication counterpart in video-phoning, camera image data, a moving image acquired from the external memory I/F, a One-Seg broadcast, and the like can be transformed into videos that meet preferences of individual users. This is made possible, for example, by adjusting parameters as shown in FIG. 20 according to types or applications of the videos. In addition, the mobile terminal may be configured so that the output video signal can be stored in the memory 17.

Specifically, the memory 17 is a medium such as a removable card-type memory, or a built-in nonvolatile memory, and may be configured capable of saving (recording) a video obtained by the processing of the color adjustor. In addition, the memory 17 may be configured capable of saving the video in association with the color adjustment parameters used for the processing.

Such association allows omission of processing for resetting the color adjustment parameters when the saved data is viewed on the display 27 again. Further, the mobile terminal may be configured so that the output video signal can be sent and received through the external connection terminal 43. Thereby, a video can be directly sent to another device, which allows, for example, the video to be displayed on a large screen through connection to a large display. Further, the mobile terminal may be configured so that video signals obtained by the color adjustment as well as set values for the color adjustment parameters can be sent and received through the external connection terminal 43 or a radio communicator 3b. For example, if the mobile terminal has a videophone function, the mobile terminal may be configured to during a video-phone call, have the color adjustor 35 adjust the color of an image of the user being taken by the camera, and to then send a video thus adjusted and set values for the color adjustment parameters. The video and each of the color adjustment parameters used for the processing may be saved in association with each other. Further, the video obtained by the processing of the color adjustor and the above described association may be stored in a dedicated storage area 17a. Only a table for the association or the like may be stored in the storage area 17a.

Figure 22:
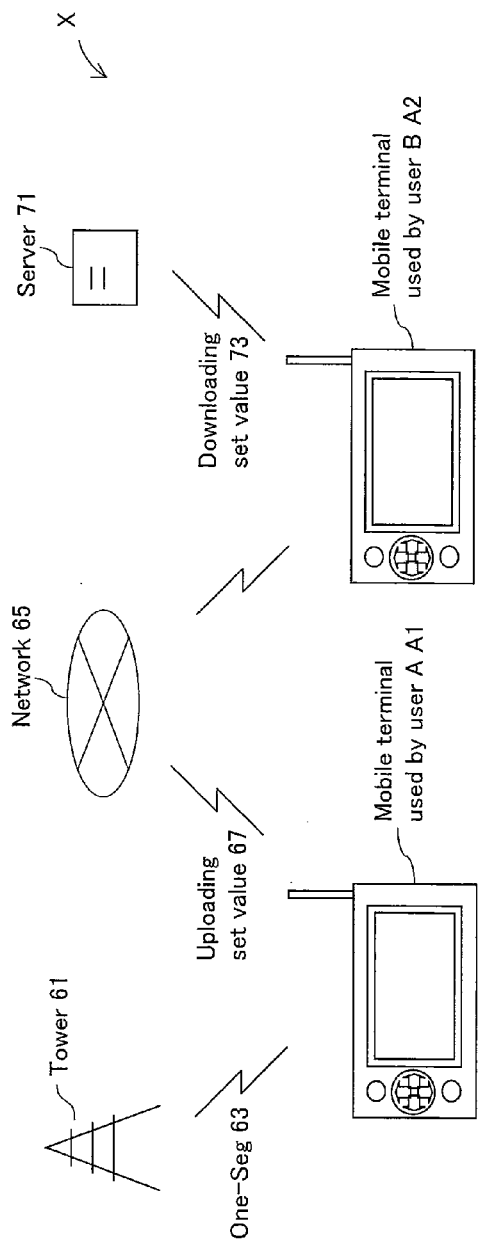
[FIG. 22]

Next, description will be given of an example of performing color adjustment for multiple mobile terminals by using the color adjustment techniques according to any one of the present embodiments. FIG. 22 is a diagram showing a configuration example of such a system. A system X shown in FIG. 22 utilizes a mobile terminal A1 used by a user A and a mobile terminal A2 used by a user B. In the mobile terminal A1 used by the user A, for example, a One-Seg broadcast 63 is received through a tower 61. Then, the user A performs color adjustment while seeing the video, and uploads set values (color adjustment parameters) that are suitable or meet the preferences (67). The set values thus uploaded are downloaded through a network 65 by the mobile terminal A2 used by the user B (73). This allows the user of the mobile terminal A2 to perform color adjustment directly using the downloaded set values, or to perform further color adjustment using the set values as a reference. This offers an advantage of saving trouble in color adjustment for certain videos. Incidentally, examples of sending set values used by the user A directly to the user B through a network include cases such as sending parameters in combination with transmission of an image of the user for a video-phone call, or sending set values preferred by the user A for One-Seg viewing. Alternatively, a One-Seg content itself may be assigned the set values (in a header portion or the like). Further, the system may be configured so that the set values can be downloaded through a server 71. This allows acquisition of set values matching moving image contents provided by the server 71.

Figure 23:
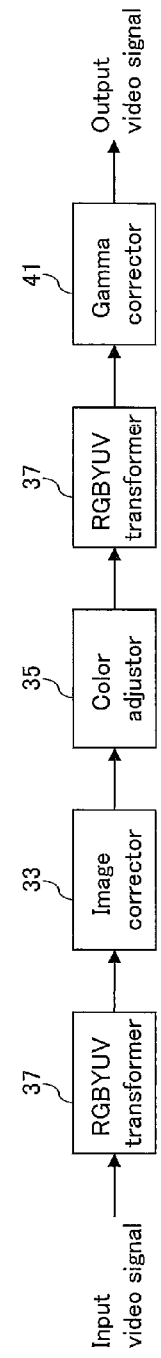
[FIG. 23]

FIG. 23 is a diagram showing a flow of processing performed by the video signal processor. As FIG. 23 shows, an input video signal proceeds to the RGBYUV transformer 37, and is transformed there. Then, the signal is subjected to image correction by the image corrector 33, and to color adjustment according to any one of the present embodiments by the color adjustor 35. Next, the signal is subjected to color transformation by the RGBYUV transformer 37, and then to gamma correction by the gamma corrector 41. An output video signal is thus obtained. More concrete description of color transformation processing will be given below, for both of cases where the processing is implemented through software processing and where the processing is implemented through hardware processing. Note that the processing can be implemented partially through hardware processing and partially through software processing.

Figure 24:
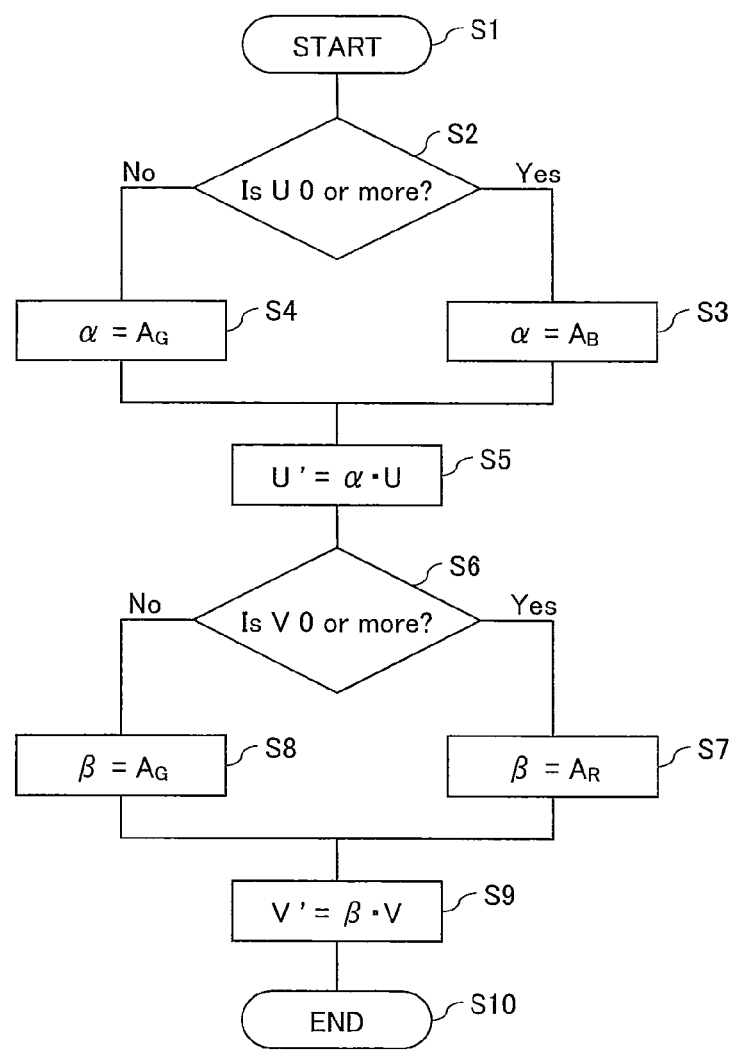
[FIG. 24]

FIG. 24 is a diagram showing an overview of color adjustment processing according to the first embodiment of the present invention. FIG. 24(A) shows a transformation equation used for first color transformation processing according to the first embodiment, and FIG. 24(B) is a flowchart showing a flow of the first color adjustment processing. First, with the start of the processing (Step S1: START), in Step S2, it is determined whether or not U is 0 or more (positive or 0). If Yes, the processing proceeds to Step S3 to substitute $A_B$ for $\alpha$ in the equation in FIG. 24(A). If No, on the other hand, the processing proceeds to Step S4 to substitute $A_G$ for $\alpha$ in the above equation. In any one of these cases, the processing proceeds from Steps S3 and S4 to Step S5 to obtain U' by using the transformation equation $U'=\alpha \cdot U$. Next, in Step S6, it is determined whether or not V is 0 or more (positive or 0). If Yes, the processing proceeds to Step S7 to substitute $A_R$ for β. If No, on the other hand, the processing proceeds to Step S8 to substitute $A_G$ for β. In any one of these cases, the processing proceeds to Step S9 to obtain V' by using V'=β·V. The transformation processing thus ends (Step S10).

FIG. 25 is a diagram showing an overview of first color adjustment processing according to the second embodiment of the present invention. FIG. 25(A) shows a transformation equation used for color transformation processing according to the second embodiment, and FIG. 25(B) is a flowchart showing a flow of the second color adjustment processing. First, with the start of the processing (Step S11: START), in Step S12, it is determined whether or not U is 0 or more (positive or 0). If Yes, the processing proceeds to Step S13 to calculate α by using $(S1+V)+(T1-V)·A_B$ as α contained in the equation in FIG. 25(A). If No, on the other hand, the processing proceeds to Step S14 to calculate α by using $α=(S2+V)+(T2-V)·A_G$.

In any one of these cases, the processing proceeds from Steps S13 and S14 to Step S15 to obtain U' by using the transformation equation U'=α·U. Next, in Step S16, it is determined whether or not V is 0 or more (positive or 0). If Yes, the processing proceeds to Step S17 to find $β=(S3+U)+(T3-U)·A_R$. If No, on the other hand, the processing proceeds to Step S18 to find $β=(S4+U)+(T4-U)·A_G$. In any one of these cases, the processing proceeds to Step S19 to obtain V' by using V'=β·V. The transformation processing thus ends (Step S20).

FIG. 26 is a diagram showing an overview of second color adjustment processing according to the second embodiment of the present invention. FIG. 26(A) shows a transformation equation used for the second color transformation processing according to the second embodiment, and FIG. 26(B) is a flowchart showing a flow of the second color adjustment processing. First, with the start of the processing (Step S21: START), in Step S22, it is determined whether or not U is 0 or more (positive or 0). If Yes, the processing proceeds to Step S23 to calculate α by using $P1(V)+Q1(V)·A_B$ as α contained in the equation in FIG. 26(A). If No, on the other hand, the processing proceeds to Step S24 to calculate α by using $α=P2(V)+Q2(V)·A_G$.

In any one of these cases, the processing proceeds from Steps S23 and S24 to Step S25 to obtain U' by using the transformation equation U'=α·U. Next, in Step S26, it is determined whether or not V is 0 or more (positive or 0). If Yes, the processing proceeds to Step S27 to find $β=P3(U)+Q3(U)·A_R$. If No, on the other hand, the processing proceeds to Step S28 to substitute $β=P3(U)+Q3(U)·A_G$. In any one of these cases, the processing proceeds to Step S29 to obtain V' by using V'=β·V. The transformation processing thus ends (Step S30).

FIG. 27 is a diagram showing an overview of first color adjustment processing according to the third embodiment of the present invention. FIG. 27(A) shows a transformation equation used for the first color transformation processing according to the third embodiment, and FIG. 27(B) is a flowchart showing a flow of the color adjustment processing. First, with the start of the processing (Step S31: START), in Step S32, it is determined whether or not U is 0 or more (positive or 0). If Yes, the processing proceeds to Step S33 to calculate α by using $α=(S1+V)·A_M+(T1-V)·A_B$ contained in the equation in FIG. 27(A). If No, on the other hand, the processing proceeds to Step S34 to calculate α by using $α=(S2+V)·A_{Ye}+(T2-V)·A_G$.

In any one of these cases, the processing proceeds from Steps S33 and S34 to Step S35 to obtain U' by using the transformation equation U'=α·U. Next, in Step S36, it is determined whether or not V is 0 or more (positive or 0). If Yes, the processing proceeds to Step S37 to find $β=(S3+U)·A_M+(T3-U)·A_R$. If No, on the other hand, the processing proceeds to Step S38 to substitute $(S4+U)·A_C+(T4-U)·A_G$. In any one of these cases, the processing proceeds to Step S39 to obtain V' by using V'=β·V. The transformation processing thus ends (Step S40).

FIG. 28 is a diagram showing an overview of second color adjustment processing according to the third embodiment of the present invention. FIG. 28(A) shows a transformation equation used for the second color transformation processing according to the third embodiment, and FIG. 28(B) is a flowchart showing a flow of the color adjustment processing. First, with the start of the processing (Step S41: START), in Step S42, it is determined whether or not U is 0 or more (positive or 0). If Yes, the processing proceeds to Step S43 to calculate α by using $α=P1(V)·A_M+Q1(V)·A_B$ contained in the equation in FIG. 28(A). If No, on the other hand, the processing proceeds to Step S44 to calculate α by using $α=P2(V)·A_{Ye}+Q2(V)·A_G$.

In any one of these cases, the processing proceeds from Steps S43 and S44 to Step S45 to obtain U' by using the transformation equation U'=α·U. Next, in Step S46, it is determined whether or not V is 0 or more (positive or 0). If Yes, the processing proceeds to Step S47 to find $β=P3(U)·A_M+Q3(U)·A_R$. If No, on the other hand, the processing proceeds to Step S48 to find $β=P4(U)·A_C+Q4(U)·A_G$. In any one of these cases, the processing proceeds to Step S49 to obtain V' by using V'=β·V. The transformation processing thus ends (Step S50).

Although the processing steps described in the flowcharts of FIGS. 24 to 28, each showing a flow of the color adjustment processing, handle first U' and then V', the processing may be performed in the order of first V' and then U'.

Figure 29:
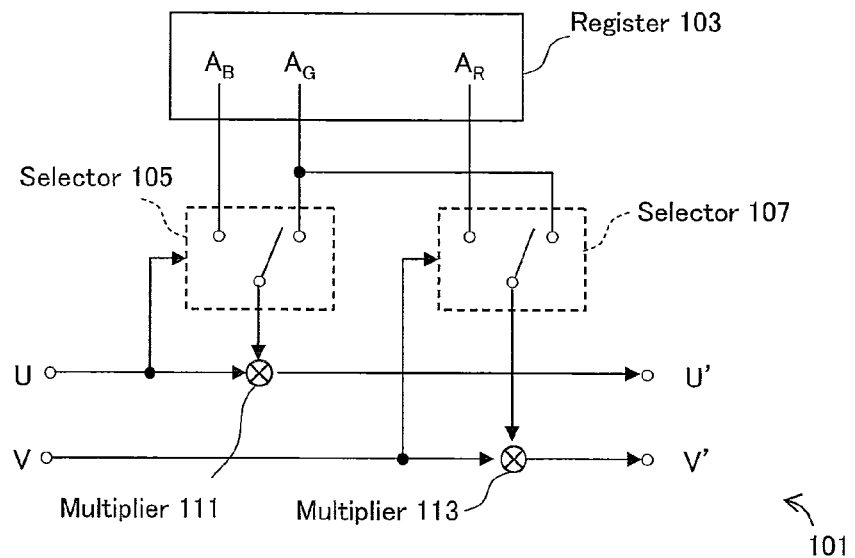
[FIG. 29]

With reference to drawings, description will be given of an example of a circuit for implementing the color transformation processing through hardware processing. FIG. 29 shows an equation used for the color transformation processing according to the first embodiment (FIG. 29(A)) and is a diagram showing a configuration example of a circuit based thereon. FIG. 29 corresponds to FIG. 24 employing software processing. As FIG. 29(B) shows, a circuit 101 for performing transformation using the equation in FIG. 29(A) has: a register 103 for storing values of $A_B$, $A_G$, and $A_R$; a first selector 105 for making a selection between $A_B$ and $A_G$ depending on whether UV values are positive or negative; a second selector 107 for making a selection between $A_G$ and $A_R$ depending on whether UV values are positive or negative; a first multiplier 111; and a second multiplier 113. U' is a multiplication value obtained by the multiplier 111 by multiplying the output of the first selector 105 by a U signal, and V' is a multiplication value obtained by the multiplier 113 by multiplying the output of the second selector 107 by a V signal. Color adjustment can be performed with such a simple configuration.

Figure 30:
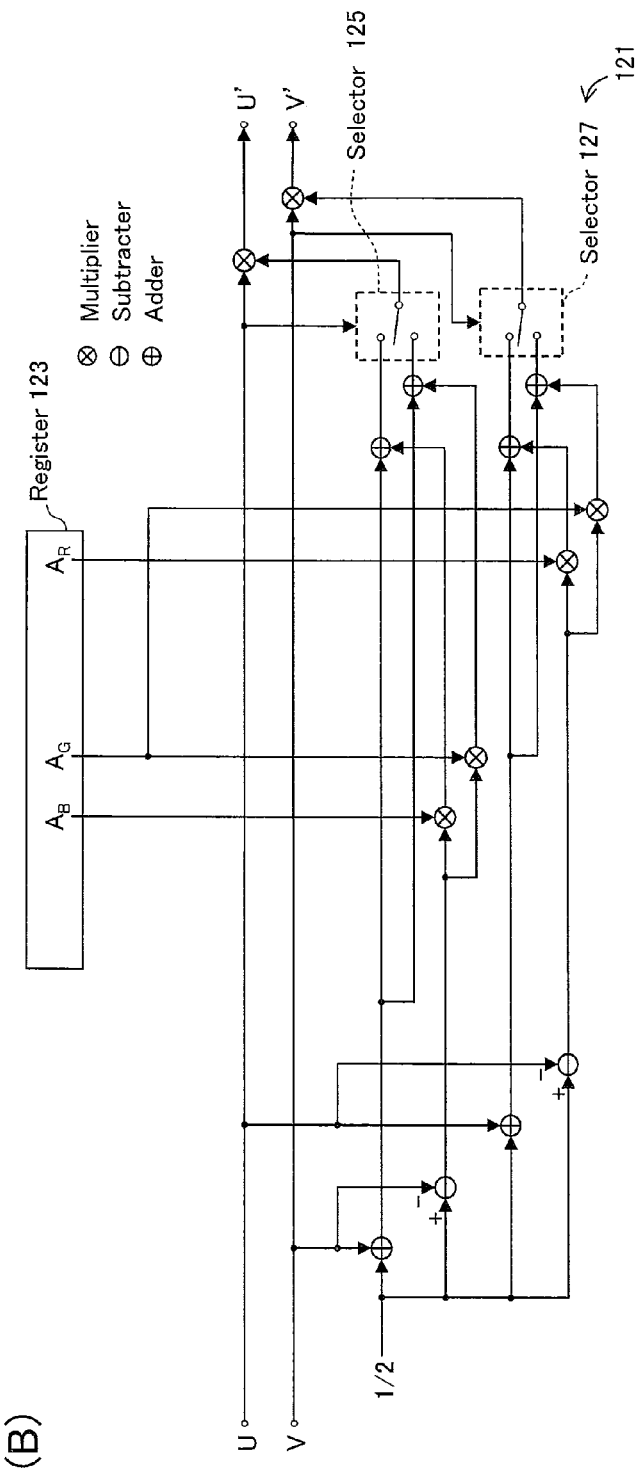
[FIG. 30]
Figure 32:
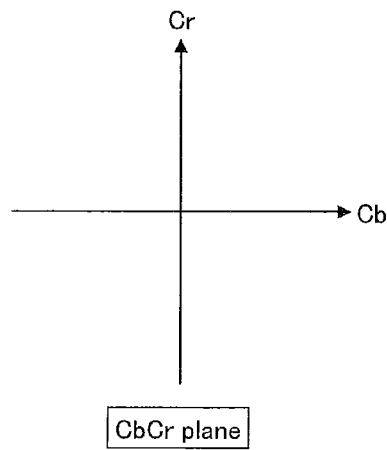
[FIG. 32]
Figure 34:
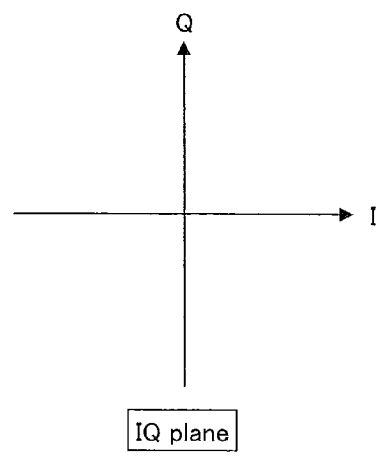
[FIG. 34]
Figure 33:
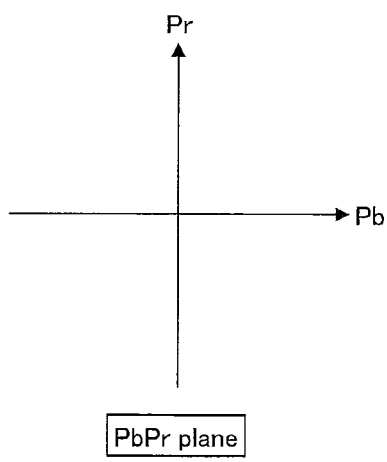
[FIG. 33]
Figure 35:
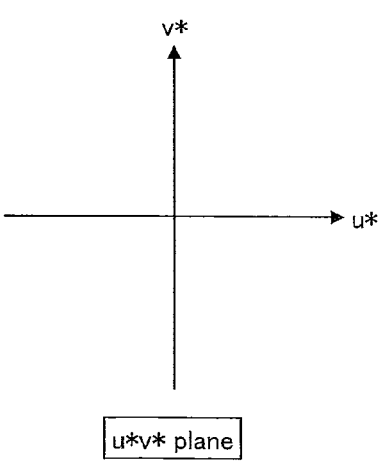
[FIG. 35]

FIG. 30 shows an equation used for the color transformation processing according to the second embodiment (FIG. 30(A)) and is a diagram showing a configuration example of a circuit based thereon. FIG. 30 corresponds to FIG. 25 employing software processing (with S1 to S4 and T1 to T4 all being set to ½). As FIG. 30(B) shows, a color adjustment circuit T121 includes a register 123, selectors 125 and 127, a multiplier, a subtracter, and an adder.

FIG. 31 shows an equation used for the color transformation processing according to the third embodiment (FIG. 31(A)) and is a diagram showing a configuration example of a circuit based thereon. FIG. 31 corresponds to FIG. 27 employing software processing (with S1 to S4 and T1 to T4 all being set to ½). As FIG. 31(B) shows, a color adjustment circuit T131 includes a register 133, selectors 135 and 137, a multiplier, a subtracter, and an adder.

As described, the color adjustment according to the present embodiments can be performed with hardware configurations.

As has been described above, with the color adjustment techniques according to the present embodiments, color adjustment can be performed with simple calculation processing.

Each of the embodiments given above has illustrated color darkness/lightness adjustment in a YUV color space. Note, however, that similar transformation can be performed in any one of other color spaces by plotting colors, such as color differences or chromaticity levels, on a plane of the space and then defining a parameter and a direction for each of the colors.

Figure 36:
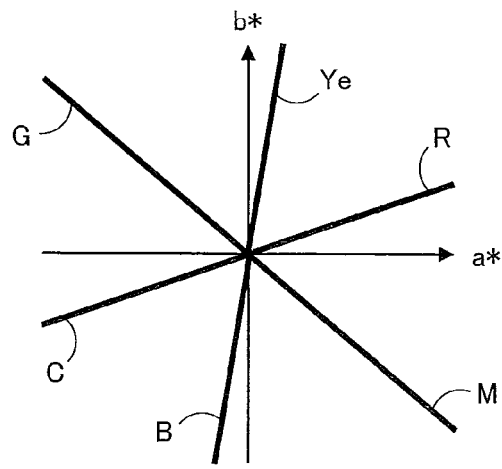
[FIG. 36]
Figure 37:
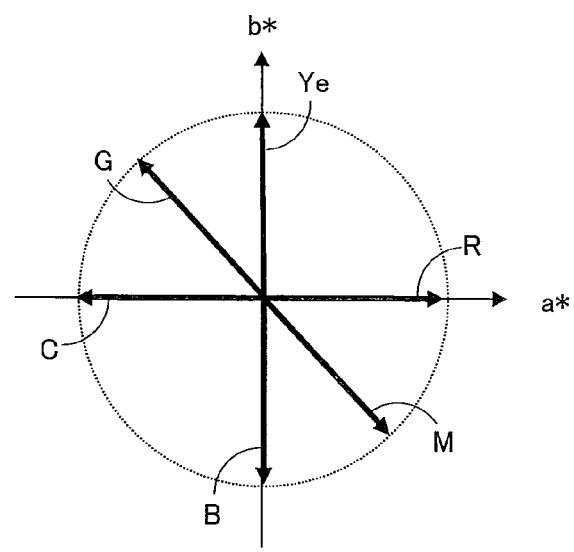
[FIG. 37]

FIGS. 32 to 35 show examples of planes on which color difference or chromaticity can be plotted: a CbCr plane, a PbPr plane, an IQ plane, and a u*v* plane, respectively. In an L*a*b* space for example, colors of RGB can be plotted on an a*b* plane, almost as shown in FIG. 36. Accordingly, by defining directions of adjustment parameters as shown in FIG. 37, darkness levels of colors can be adjusted in a manner similar to what is described above.

INDUSTRIAL APPLICABILITY

The present invention is applicable to a color adjustment circuit and a video device or the like using the color adjustment circuit.

The invention claimed is:

1. A color adjustment circuit that adjusts a color that can be represented on a color plane defined by two mutually orthogonal axes (hereinafter referred to as an X axis and a Y axis) in a color space having any one of brightness and lightness as an independent component, the color plane not including the independent component, the color adjustment circuit comprising a color adjustor that:
when an input color to the color adjustment circuit includes only one of components of RGBCMYe (hereinafter a particular component) and is on neither the X axis nor the Y axis, adjusts the input color in a component direction of the axis forming a smaller angle of, on the color plane, a first angle being a small one of angles formed between a straight line representing the particular component and the X axis, and a second angle being a small one of angles formed between the straight line and the Y axis, and
does not adjust the input color in a component direction of the other axis.

2. The color adjustment circuit according to claim 1, wherein:
the color adjustor adjusts the input color in both of the component directions of the X axis and the Y axis instead of the processing according to claim 1 when the straight line representing the particular component is included in a first range on the color plane, the first range being sandwiched by two straight lines passing through an origin, including straight lines forming an angle of 45°, an angle of 135°, an angle of 225°, and an angle of 315°, respectively, with respect to the X axis, and not including the X axis and the Y axis; and
the color adjustor performs the processing according to claim 1 when the straight line representing the particular component is included in a second range on the color plane, the second range being obtained by excluding the first range from the color plane.

3. The color adjustment circuit according to any one of claims 1 and 2, wherein
the color plane is a UV plane,
when the input color is any one of R and C, the color adjustor adjusts the input color in a component direction of a V axis and does not adjust the input color in a component direction of a U axis, and
when the input color is any one of B and Ye, the color adjustor adjusts the input color in the component direction of the U axis and does not adjust the input color in the component direction of the V axis.

4. The color adjustment circuit according to claim 2, wherein
the color plane is a UV plane,
when the input color is any one of R and C, the color adjustor adjusts the input color in a component direction of a V axis and does not adjust the input color in a component direction of a U axis,
when the input color is any one of B and Ye, the color adjustment circuit adjusts the input color in the component direction of the U axis and does not adjust the input color in the component direction of the V axis,
when the input color is G, the color adjustor adjusts the input color only in a direction of a straight line forming an angle of 225° with respect to the X axis, the straight line being shifted from the X axis in a counterclockwise direction around the origin, and
when the input color is M, the color adjustor adjusts the input color only in a direction of a straight line forming an angle of 45° with respect to the X axis, the straight line being shifted from the X axis in a counterclockwise direction around the origin.

5. The color adjustment circuit according to claim 1, wherein
when the input color includes a component, other than the particular component, that exists in a same quadrant of the color plane where a color including only the particular component exists, the color adjustor adjusts the input color in a same direction as a direction in which the color including only the particular component is adjusted.

6. The color adjustor according to claim 1, wherein when the input color exists in a quadrant on the other side of the origin from the quadrant where the particular component exists, the color adjustor does not adjust the input color.

7. The color adjustor according to claim 1, comprising a color-space transformer that performs any one of: transforming color representation by RGBCMYe into color representation in the color plane and inputting the color representation thus obtained into the color adjustor; and transforming an output from the color adjustor from the color representation in the color plane into the color representation by RGBCMYe.

8. The color adjustor according to claim 1, wherein
any one of the particular component and an amount by which the particular component is adjusted is settable from outside of the color adjustor.

9. A color adjustment device comprising:
the color adjustment circuit according to claim 8; and
a setting part that sets the particular component and the amount by which the particular component is adjusted.

10. A color adjustment method for a color adjustment circuit adjusting a color that can be represented on a color plane defined by two mutually orthogonal axes (hereinafter referred to as an X axis and a Y axis) in a color space having any one of brightness and lightness as an independent component, the color plane not including the independent component, the color adjustment method comprising:

when an input color to the color adjustment circuit includes only one of components of RGBCMYe (hereinafter a particular component) and aligns with neither the X axis nor the Y axis, causing the color adjustment circuit to adjust the input color in a component direction of the axis forming a smaller angle of, on the color plane, a first angle being a small one of angles formed between a straight line representing the particular component and the X axis, and a second angle being a small one of angles formed between the straight line and the Y axis, wherein the color adjustment circuit does not adjust the input color in a component direction of the other axis.

11. A non-transitory computer readable medium storing a program for causing a computer to execute a color adjustment method for adjusting a color that can be represented on a color plane defined by two mutually orthogonal axes (hereinafter referred to as an X axis and a Y axis) in a color space having any one of brightness and lightness as an independent component, the color plane not including the independent component, the color adjustment method comprising:

when an input color includes only one of components of RGBCMYe (hereinafter a particular component) and aligns with neither the X axis nor the Y axis, adjusting the input color in a component direction of the axis forming a smaller angle of, on the color plane, a first angle being a small one of angles formed between a straight line representing the particular component and the X axis, and a second angle being a small one of angles formed between the straight line and the Y axis, and not adjusting the input color in a component direction of the other axis.

* * * * *